(12) United States Patent
Lawson et al.

(10) Patent No.: US 8,176,960 B2
(45) Date of Patent: May 15, 2012

(54) SYSTEM FOR TRANSPORTING AND MANIPULATING TIRES AND WHEELS

(75) Inventors: Lawrence J. Lawson, Troy, MI (US); Edwin Reece, Clarkston, MI (US); Robert Reece, Clarkston, MI (US)

(73) Assignee: Android Industries LLC, Auburn Hills, MI (US)

( * ) Notice: Subject to any disclaimer, the term of this patent is extended or adjusted under 35 U.S.C. 154(b) by 0 days.

(21) Appl. No.: 12/938,827

(22) Filed: Nov. 3, 2010

(65) Prior Publication Data

US 2011/0042015 A1 Feb. 24, 2011

Related U.S. Application Data

(62) Division of application No. 11/335,063, filed on Jan. 18, 2006, now Pat. No. 7,845,655.

(60) Provisional application No. 60/644,857, filed on Jan. 18, 2005.

(51) Int. Cl.
*B60C 25/132* (2006.01)
(52) U.S. Cl. .......................... 157/1; 157/1.17
(58) Field of Classification Search ............ 157/1.1, 157/1.17, 1.2, 1.22, 1.24, 18, 1
See application file for complete search history.

(56) References Cited

U.S. PATENT DOCUMENTS

| | | | | |
|---|---|---|---|---|
| 2,577,684 | A | * | 12/1951 | Horne ......................... 157/1.24 |
| 2,595,258 | A | * | 5/1952 | Hildred ......................... 157/1.2 |
| 2,730,166 | A | * | 1/1956 | Davidson et al. ............... 157/1.2 |
| 3,182,823 | A | | 5/1965 | Chasar |
| 3,866,654 | A | | 2/1975 | Duquesne |
| 4,090,548 | A | * | 5/1978 | Wolf ............................. 157/18 |
| 4,137,984 | A | | 2/1979 | Jennings et al. |
| 4,884,611 | A | | 12/1989 | Schmidt |
| 4,896,712 | A | * | 1/1990 | du Quesne ................... 157/1.24 |
| 5,072,765 | A | | 12/1991 | Kane et al. |
| 5,074,143 | A | | 12/1991 | Nolan et al. |
| 5,115,747 | A | | 5/1992 | Teissier et al. |
| 5,232,035 | A | * | 8/1993 | Adams, Jr. ................... 157/1.17 |
| 5,257,443 | A | | 11/1993 | Tanimura et al. |
| 5,415,218 | A | * | 5/1995 | Shibazaki ...................... 157/1.2 |
| 5,570,733 | A | | 11/1996 | Desparois et al. |
| 5,575,605 | A | | 11/1996 | Fisher |
| 5,878,801 | A | | 3/1999 | Ellis |
| 6,089,083 | A | | 7/2000 | Curtis |

(Continued)

FOREIGN PATENT DOCUMENTS

CA 2314617 1/2002

(Continued)

OTHER PUBLICATIONS

Office Action from the Chinese Patent Office dated Jan. 15, 2010 for application No. 200680002608.1.

(Continued)

*Primary Examiner* — Hadi Shakeri
(74) *Attorney, Agent, or Firm* — Honigman Miller Schwartz and Cohn LLP

(57) ABSTRACT

A factory layout including a track circuit, one or more wheeled carts for traversing the track circuit and a tire/wheel assembly carried by the wheeled cart. One or more work stations can be positioned at locations along the track circuit. Various wheeled cart embodiments are disclosed and various work station configurations are disclosed.

15 Claims, 23 Drawing Sheets

U.S. PATENT DOCUMENTS

| | | | |
|---|---|---|---|
| 6,095,541 A | | 8/2000 | Turner et al. |
| 6,125,904 A | * | 10/2000 | Kane et al. ............ 157/1.24 |
| 6,148,892 A | | 11/2000 | Koerner et al. |
| 6,392,322 B1 | | 5/2002 | Mares et al. |
| 6,463,982 B1 | * | 10/2002 | Doan ................. 157/1.1 |
| 6,467,524 B2 | * | 10/2002 | Ronge et al. ............ 157/1.17 |
| 7,044,188 B2 | * | 5/2006 | Pellerin et al. ............ 157/1.17 |
| 2009/0084506 A1 | | 4/2009 | Lawson et al. |

FOREIGN PATENT DOCUMENTS

| | | |
|---|---|---|
| CN | 2093111U U | 1/1992 |
| DE | 19823260 | 12/1999 |
| DE | 19823260 A1 | 12/1999 |
| DE | 29907990 | 12/1999 |
| DE | 29907990 U1 | 12/1999 |
| DE | 102005001212 A1 | 7/2006 |
| EP | 0052586 | 5/1982 |
| EP | 0544150 | 6/1993 |
| EP | 1342593 A1 | 9/2003 |
| JP | 06-080090 | 3/1994 |
| JP | 06080090 | 3/1994 |
| JP | 11-129714 A | 5/1999 |
| KR | 20020043291 A | 6/2002 |
| WO | WO-03/049988 | 6/2003 |
| WO | WO-2006078784 A2 | 7/2006 |

OTHER PUBLICATIONS

Office Action from the Canadian Patent Office dated Mar. 1, 2010 for Application No. 2,591,674.

Office Action from Mexican Patent Office for Application MX/a/2007/008703 dated Apr. 4, 2010.

European Search Report for Application EP10155607 dated May 7, 2010.

Office Action dated Jan. 11, 2010 for U.S. Appl. No. 11/335,063.

Office Action dated Jun. 22, 2010 for U.S. Appl. No. 11/335,063.

Office Action from Canadian Patent Office for Application 2,591,674 dated Apr. 15, 2011.

International Search Report for application PCT/US2011/039936 dated Feb. 29, 2012.

* cited by examiner

SYSTEM FOR TRANSPORTING AND MANIPULATING TIRES AND WHEELS

CROSS-REFERENCE TO RELATED APPLICATIONS

This Application is a Division of application Ser. No. 11/335,063 filed on Jan. 18, 2006. Application Ser. No. 11/335,063 claims the benefit of U.S. Provisional Application 60/644,857 filed on Jan. 18, 2005, which is entirely incorporated herein by reference.

TECHNICAL FIELD

The present invention generally relates to transportation and manipulation systems and more particularly relates to systems for transporting and manipulating tires and wheels.

BACKGROUND OF THE INVENTION

The complex nature of modern vehicle production makes it inefficient to assemble all of a vehicle's systems and subsystems at a single production facility. Accordingly, a common approach is to disburse the assembly process such that subsystem vendors are responsible for assembling one or more subsystem at an offsite facility. These subsystems are then provided to the vehicle builder who is responsible for integrating all of the vehicle systems and subsystems into a complete product.

Tire/wheel assemblies are often considered a "subsystem" as described above and they are commonly assembled and tested by a subsystem provider before they are turned over to a vehicle manufacturer for assembling to a vehicle. Tire/wheel assembly plants typically incorporate "assembly lines" which are effective for mounting vehicle tires to vehicle wheels and performing additional process steps necessary to produce a tire/wheel assembly that is vehicle worthy. For example, additional process steps may involve matching tire sizes and styles with the appropriate wheel, mounting valve stems in wheels, pressurizing the tire/wheel assembly, balancing, and testing. A bead seating operation may also be included (bead seating involves flexing the tire to remove microscopic air bubbles that may have become trapped between the tire bead and the wheel bead seat during the tire mounting operation). Additionally, tire/wheel assemblies fitted with tire pressure monitor sensors (TPM sensors) may undergo TPM testing. TPM sensors are used to monitor the tire's air pressure and radio transmit tire pressure information to a receiver located in the vehicle.

In order to accomplish the transportation/manipulation, and testing of the tire/wheel assemblies, many complex operations must be implemented and followed at the tire/wheel assembly plant, and accordingly, an orderly scheme for transporting the tire/wheel assembly within the assembly plant must be employed in order to efficiently move high volumes of product through the plant. The present invention sets forth systems, apparatuses, and methods for efficiently transporting, assembling, and testing wheels, tires, and tire/wheel assemblies through an assembly plant.

Many devices must be used to manipulate the tire/wheel assemblies during the assembly, and testing process. The present invention sets forth several systems used in a high volume production environment for manipulating and testing tire/wheel assemblies.

Several systems for manipulating a tire/wheel assembly disclosed herein relate to a tire inflation apparatus. Also set forth herein are several systems for seating a tire bead to a wheel bead seat to ensure that the tire is properly seated to the wheel bead seat. During the process of installing the vehicle tire to the vehicle wheel, microscopic air bubbles may become entrapped between the engagement surface defined between the tire and the wheel. If these microscopic air bubbles are not removed prior to balancing the wheel, they may escape once the tire/wheel assembly is mounted to a vehicle and the vehicle is operated under normal driving conditions. The escaping entrapped air may cause the tire/wheel assembly to become imbalanced. Out-of-balance tires often require warranty work to be performed either within the assembly plant or at a dealership in order to properly re-balance the tires. Warranty work not only is expensive but can lead to customer discontent. In order to eliminate the tire balance issue discussed above, the present invention incorporates a means of disrupting at least one of a tire or a wheel to ensure proper tire bead seating against the wheel bead seat.

DETAILED DESCRIPTION OF THE INVENTION

Plant Layout

Figure 1:
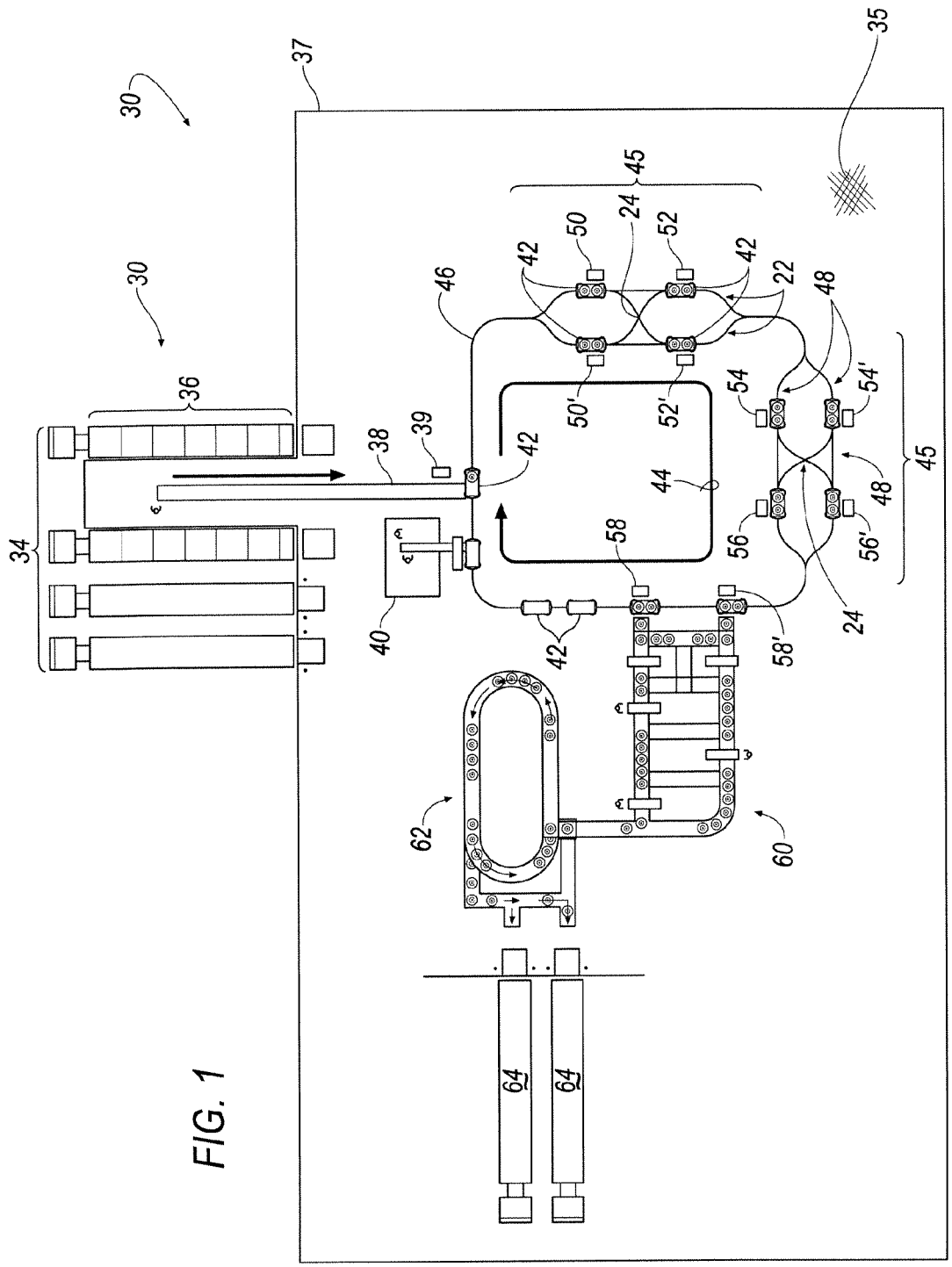
FIG. 1 is a schematic view of an embodiment of a plant layout utilizing a plurality of work stations and a plurality of wheeled carts to transport tires, wheels, and tire/wheel assemblies between work stations.

The plant layout 30 of the present invention includes one or more delivery areas 34 adapted to accept the inflow of vehicles carrying wheels, tires, tire pressure valves, tire pressure sensors, and any other components or subcomponents that are adapted to be integrated into a completed tire/wheel assembly. Delivery areas 34 can be adapted to receive trucks, railroad cars or any other delivery means commonly used for the delivery of components used in a tire/wheel assembly. The components are unloaded from the vehicles docked in the delivery areas and they may be transported therefrom to one or more staging areas 36. Staging areas 36 can be used for component inspection, testing, or pre-assembly. Once the components are ready for assembly, they are transported by way of a transport means 38 to a first work station 39. Transport means 38 can be a conveyor system, a wheeled cart or any mechanism used to transport components. First work station 39 operates in a first manner upon the tire/wheel assembly. The particulars of this first operation is not critical and can include any number of operations (such as mounting an air inflation valve to a wheel and applying soap to select surfaces of the tire, the wheel, or both, or the like). Work station 39 may represent a manual operation, a fully automatic operation, or a hybrid manual-automatic operation. After the task performed at first work station 40 is complete, wheeled cart 42 manipulates its way along circuit 44 by way of track 46. Track 46 is designed to define one or more paths of travel available to wheeled cart 42 and can be comprised of traditional track materials (such as rails and the like) or, it may be comprised of any means that wheeled cart 42 can use to guide its movement as it traverses circuit 44. Alternatives to installing traditional track materials include a painted line or the like disposed on a floor surface 35 of plant 37. This painted line can be detected using an optical track sensing device located on wheeled cart 42 to guide the traversal path of wheeled cart 42 as it traverses circuit 44. Other track following devices (e.g. proximity devices) may be used such as pressure sensitive sensors used to follow a floor depression or a floor protuberance. It is also contemplated that various conduits, electrical conductors or other means can be laid beneath the surface of the plant floor 35 such that radio frequency, ultrasonic or other sensing means can be used to sense the location of the "buried" tracks. Track 46 can be positioned above or below wheeled cart 42. It is also contemplated that wheeled cart 42 can include a receiver (e.g. a radio) and servo controller, wherein the receiver is capable of receiving GPS coordinate information. Under this design, cart 42 could use the GPS coordinate information for traversing one or more paths of circuit 44 defined within a preprogrammed storage means. Preprogrammed storage means can be implemented on cart 42, or can be implemented on a remote central controller (not shown) wherein the coordinate information could be transmitted from the remote controller to cart 42.

Predefined zones 45 along circuit 44 can split into parallel track segments 22, 48. Parallel track segments 22 can include cross-over segments 24. Cross-over segments 24 positioned between parallel track segments 22 allow a cart that is located on one of the parallel track segments 22 to cross-over to a neighboring parallel track. This cross-over function can be useful if a cart 42 is taken off-line for servicing or is otherwise rendered unoperational. Circuit 44 can be designed to include two or more parallel cart tracks 22, 48, at select locations along circuit 44, where various work stations are located. For example, tire mounter work stations 50, 50' and tire inflator work stations 52, 52' are located along parallel tracks 22. Also, tire pressure monitor checker work stations 54, 54' and bead seater work station 56, 56' are located in parallel cart tracks 48. Pick and place work stations 58, 58' can be used to remove tire/wheel assemblies from the carts traversing circuit 44 and to transfer the tire/wheel assemblies to off-circuit work stations (such as balancer/balance audit work station 60). From work station 60, the tire/wheel assemblies are transferred to silo 62 where they are categorized, stacked, and otherwise made ready for shipment by way of carriers 64. If any tire/wheel assemblies do not meet audit standards, they are transitioned by way of a wheeled cart 42 to a repair work station 40 where repair is attempted.

Figure 2:
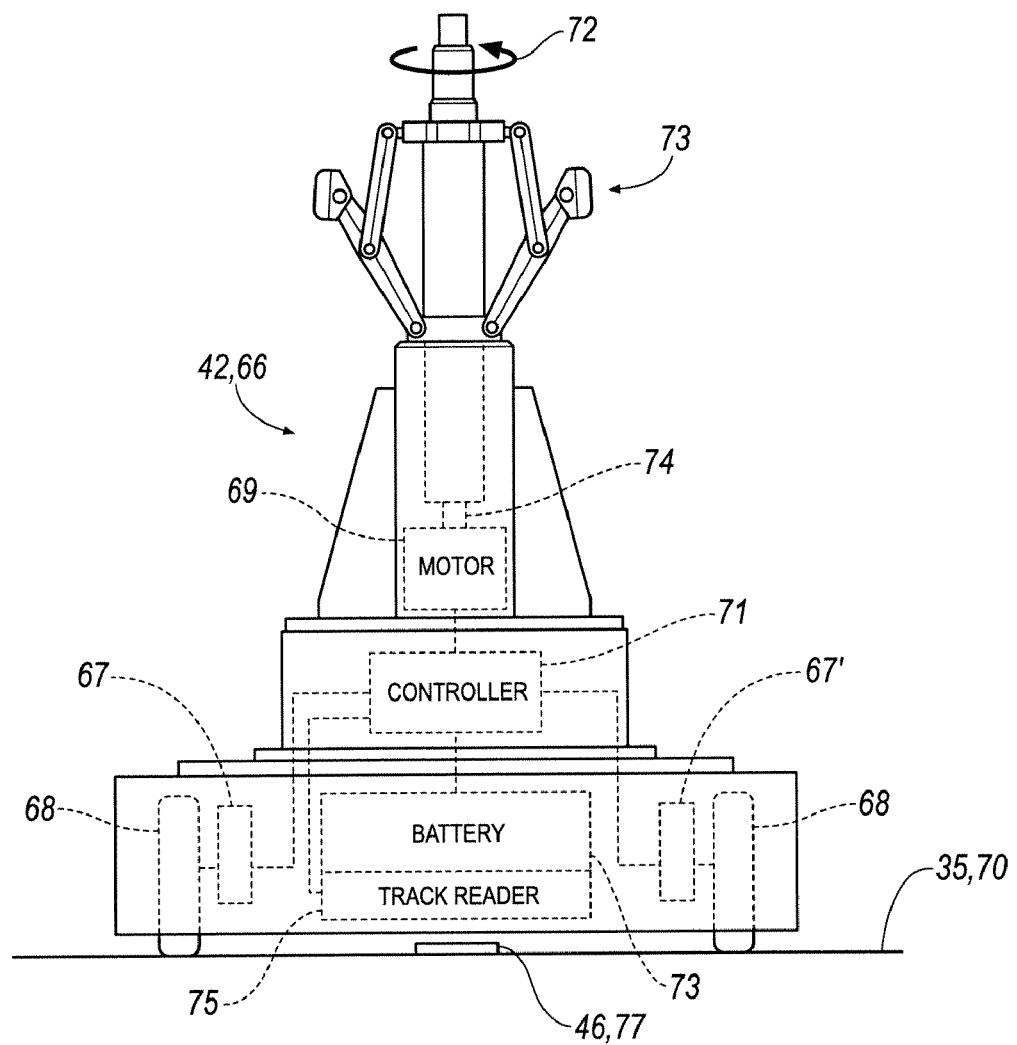
FIG. 2 is an embodiment of a wheeled cart adapted to traverse the circuit of FIG. 1.

Now referring to FIG. 2, in an embodiment, wheeled cart 42, 66 includes a plurality of wheels 68 adapted to engage a load bearing surface 70 (such as a plant floor 35 or the like). Wheeled cart 42, 66 can include one or more motors 69 which are controlled by one or more controllers 71. One or more controllers 71 can be powered by one or more electric batteries 73. In an alternative embodiment, electric power for powering the various electric devices 69, 71 on wheeled cart 66 can be delivered via electrical conductors placed along load bearing surface 70 wherein wheeled cart 66 can be fashioned with contact elements (such as brushes or the like) effective for transferring electrical current from the conductive members in load bearing surface 70 to the electrical components 69, 71 on wheeled cart 42, 66. Various embodiments of track reader 75 have already been discussed in conjunction with FIG. 1 and track reader 75 includes any means of determining the position of wheeled cart 42, 66 with respect to one or more prescribed paths 46, 77 along load bearing surface 70. The prescribed path can be defined by track materials or other physical mediums 46, 77 (already described) associated with floor 35, or the prescribed path may be coordinate data associated with the plant floor (that is never embodied in the plant floor—e.g. GPS coordinates).

One or more controllers 71 are effective for interfacing with wheel motors 67, 67', battery 73, and track reader 75 for manipulating the direction, speed and other devices that may be located on wheeled cart 42, 66. Controller 71 can be preprogrammed to operate autonomously without the intervention of a central controller (central controller not shown) or, in the alternative, wheeled cart 42, 66 can be designed so that it executes the commands transmitted to it by way of a central controller. Commands may be transmitted to wheeled cart 42, 66 from a central controller by way of radio signals, track member 77, or other means (e.g. infrared signals, copper cables, and the like).

Figure 3:
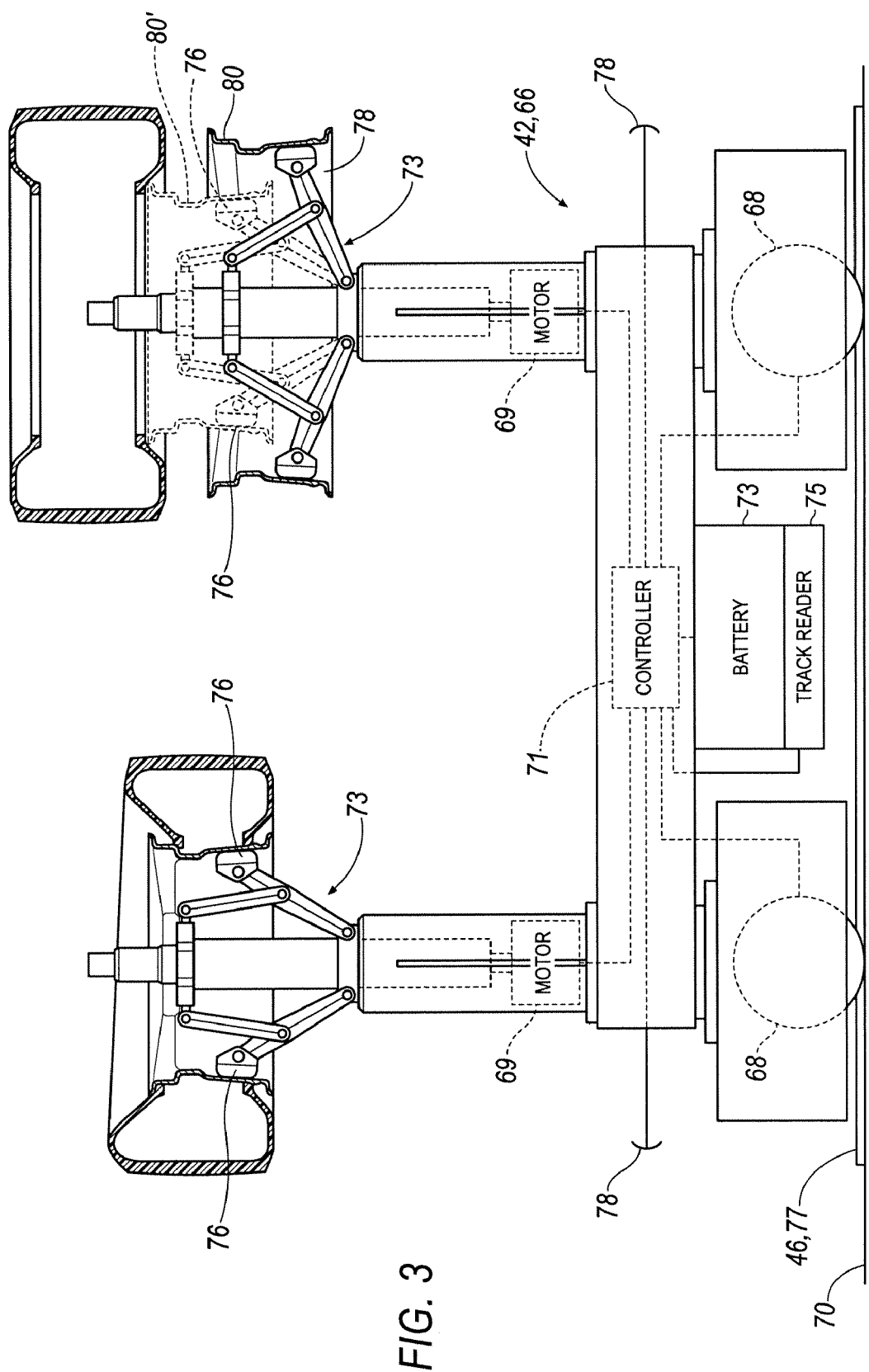
FIG. 3 is another embodiment of a wheeled cart adapted to traverse the circuit of FIG. 1.

Now referring to FIGS. 2 and 3, wheeled cart 42, 66 can be a single unit embodiment (see FIG. 2) or a double unit embodiment (see FIG. 3). Single unit embodiments are only capable of carrying one tire/wheel assembly while dual unit carts are capable of carrying a pair of tire/wheel assemblies (see FIG. 3). Also, wheeled cart 42, 66 can be fashioned with one or more sensing bumpers 78 which communicate with controller 71. Whenever contact is made against sensing bumper 78, controller 71 can respond in any number of ways (such as immediately ceasing movement of wheeled cart 42, 66 in order to avoid possible equipment damage). Wheeled carts 42, 66 can be designed to carry any number of working apparatus' 73. For example, in the embodiment shown in FIGS. 2 and 3, working apparatus 73 is a radially adjustable wheel gripping mechanism for gripping an inner diameter portion 78 of a wheel 80.

Figure 4:
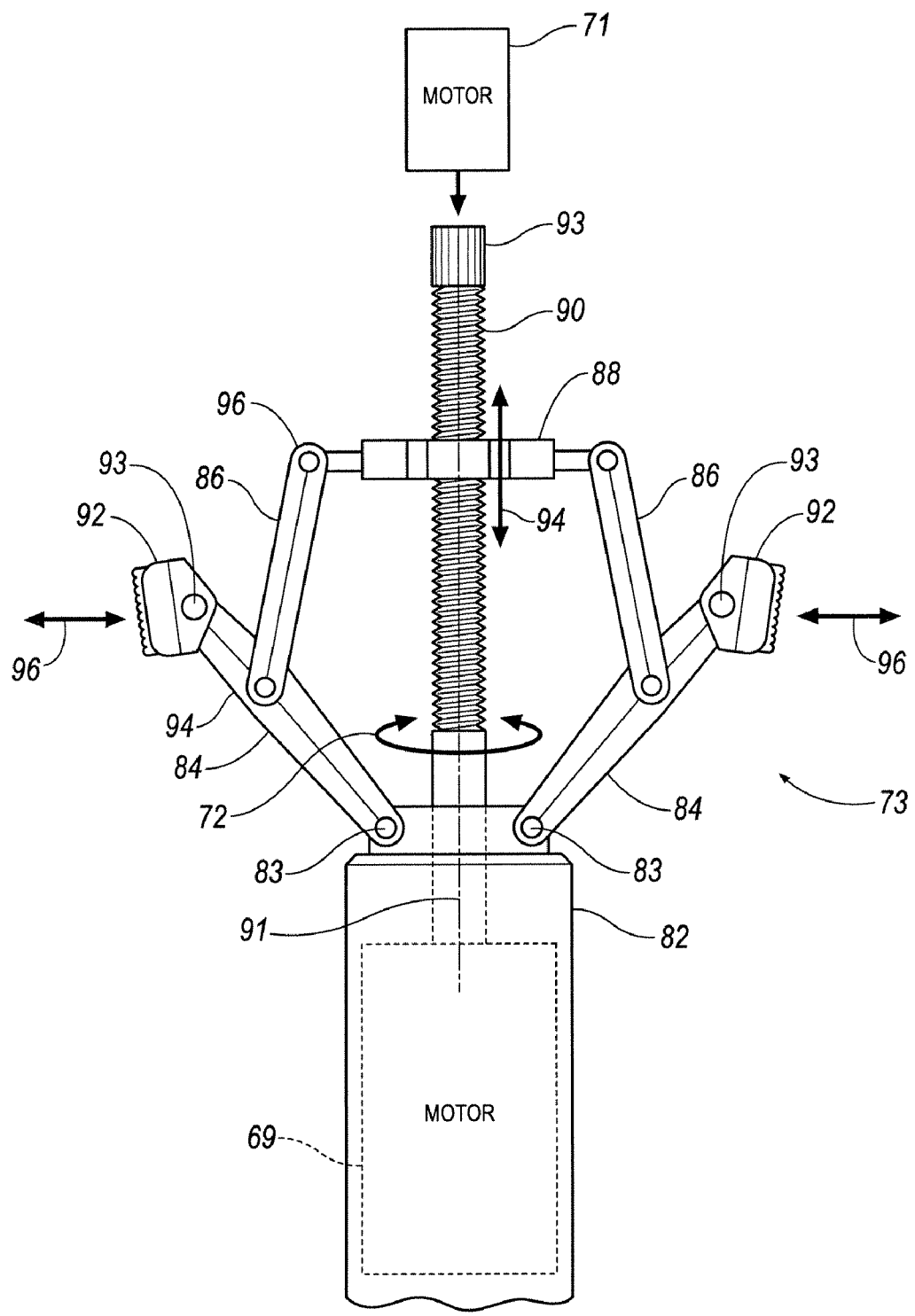
FIG. 4 is a schematic view of a wheel gripping mechanism adapted for attachment to one or more embodiments of a wheeled cart.

Now referring to FIGS. 2-4, wheel gripping mechanism 73 includes base 82 which is attached to wheeled cart 42, 66. Base 82 supports, at a first pivot joint 83, one or more hinged arms 84. Hinged arms 84 terminate at a second pivot joint 93, that pivotally supports a wheel gripping member 92. Intermediate arm 86 includes a first end 94 and a second end 96. First end 94 of intermediate arm 86 is pivotally connected to hinged arm 84 and the second end 96 of intermediate arm 86 is pivotally connected to threaded nut 88. Threaded nut 88 is threadedly connected to threaded drive shaft 90. Threaded drive shaft 90 can be rotated from either motor 69 (mounted to wheeled cart 42, 66) or via an external motor 71 which can be selectively engaged to a top portion 93 of threaded drive shaft 90 when wheeled cart 42, 66 is located in proximity to one or more work stations. When either motor 69 or 71 is rotated, threaded nut 88 traverses threaded drive shaft 90 along path 94. Traversal path 94 is substantially parallel to the longitudinal axis 91 of threaded drive shaft 90. When threaded nut 88 traverses path 94, linkage 84, 86 causes wheel gripping members 92 to traverse along path 96. Path 96 is substantially perpendicular to path 94. When working apparatus 73 is placed within an inner diameter 78 of a wheel 80 (see FIG. 3), and motor 69, 71, is rotated 72, wheel gripping members 92 can be made to move outwardly along path 96 until they outwardly urge against the inner diameter 78 of wheel 80. Inner diameter 78 can be defined as a surface of the wheel 80 that is substantially parallel to the axis of rotation 91. This outward urging is effective for maintaining the vehicle wheel in a fixed position with respect to wheeled cart 42, 66. It can also be easily understood that working apparatus 73 is effective for gripping any number of different wheel diameters by virtue of the expanded or contracted positions wheel gripping members 92 can be made to assume (by virtue of manipulating either motor 69 or 71). The right-most working apparatus in FIG. 3 shows (in phantom) a wheel 80' (having a first wheel diameter) supported by wheel gripping mechanism 73 (in phantom) in a first position and also shows wheel 80 (having a second wheel diameter) supported by wheel gripping mechanism 73 in a second position. Thus, the working apparatus 73 of FIG. 2-4 is effective for gripping and securing a tire/wheel assembly to wheeled cart 42, 66 as wheeled cart travels from work station to work station.

Figure 5:
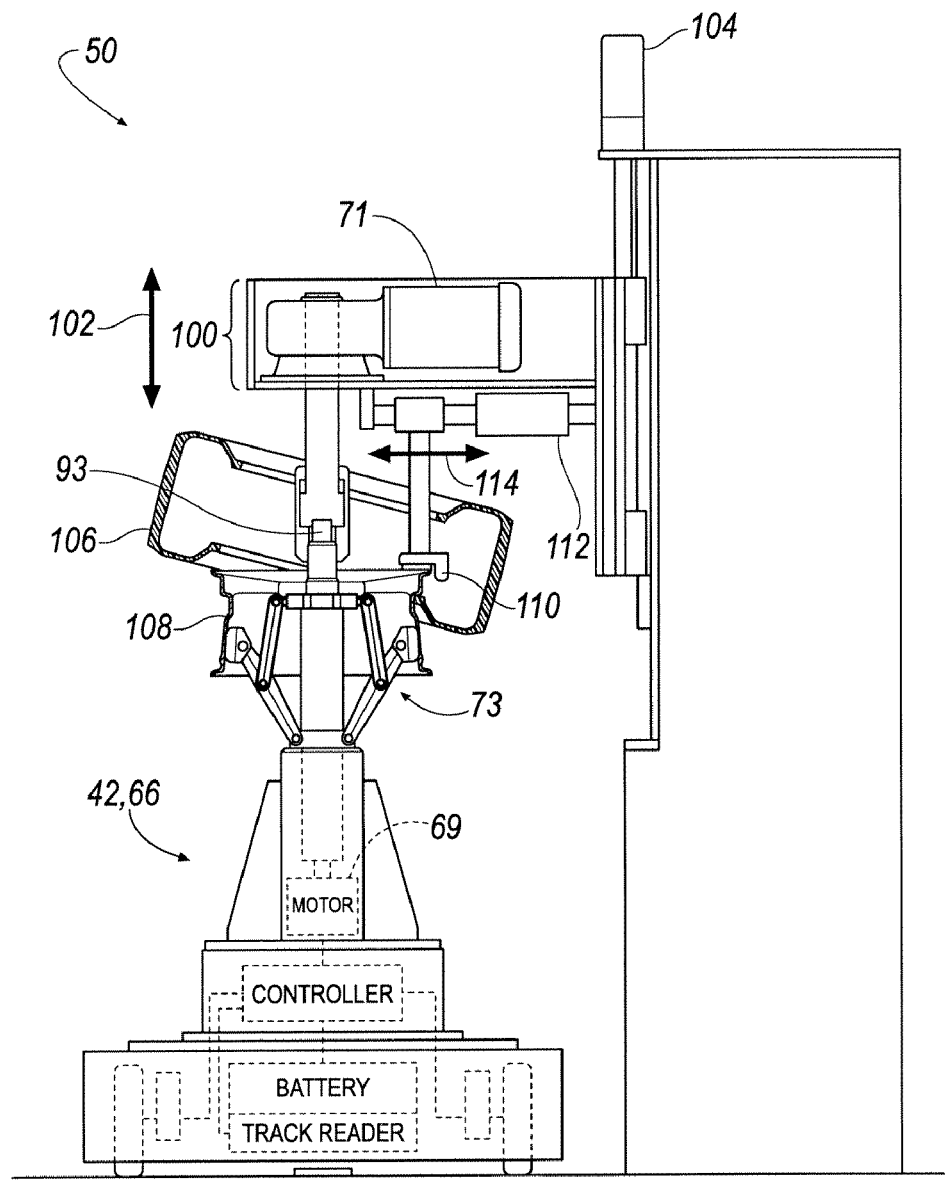
FIG. 5 is a front elevational view of an embodiment of a wheeled cart, wherein the wheeled cart is shown proximate an embodiment of a tire mounting work station located along the circuit of FIG. 1.
Figure 6:
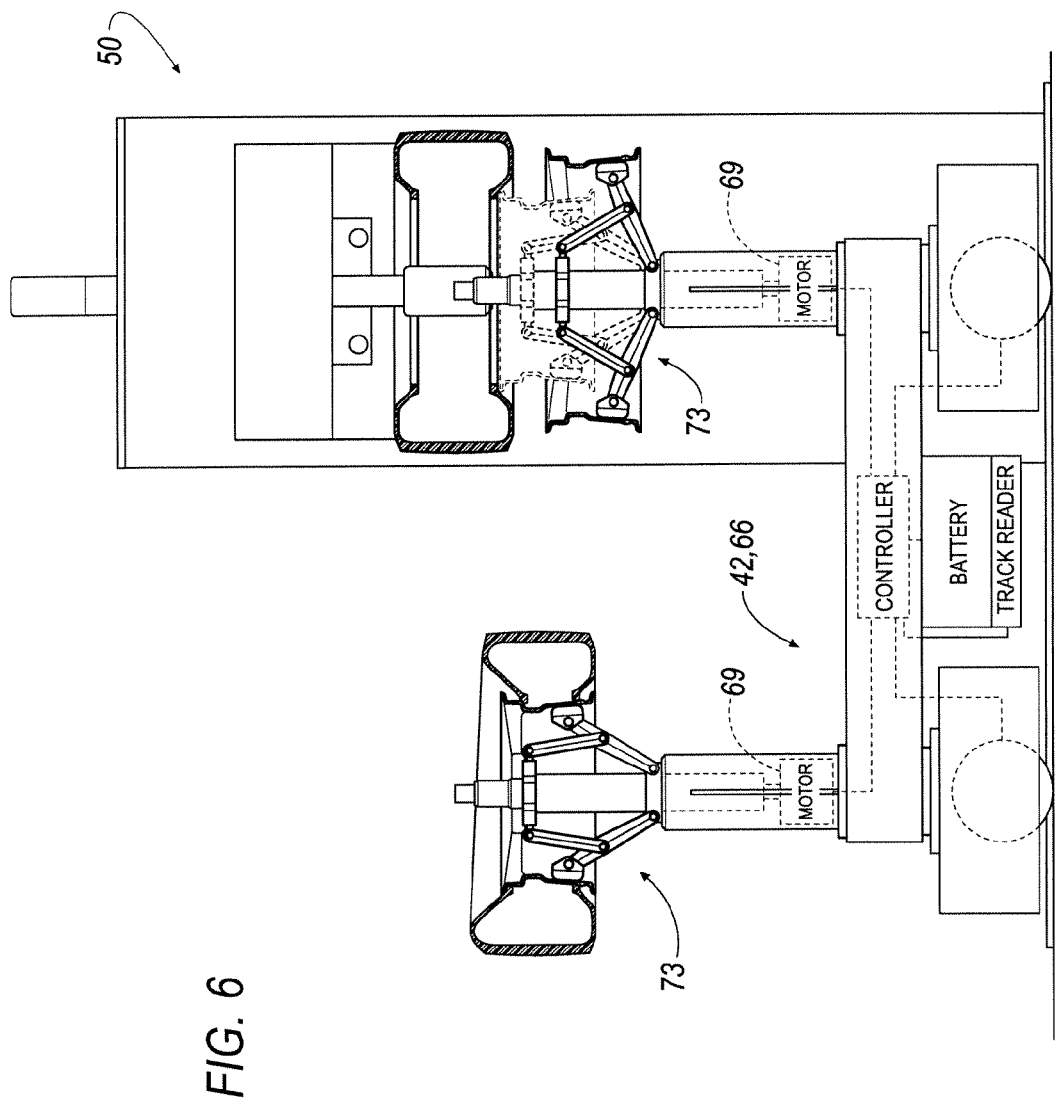
FIG. 6 is a side elevational view of FIG. 5.

Now referring to FIGS. 5 and 6, wheeled cart 42, 66 is shown in proximity to tire mounting work station 50. Tire mounting work station 50 includes a working head 100 which is vertically manipulatable 102 by way of drive 104. Working head 100 can carry any number of working apparatus designed to do work upon tire and wheel assembly. In the embodiment of FIGS. 5 and 6, working apparatus includes a motor 71 for rotating the wheel 108 at the appropriate time. Other tire installation tools can be attached to working head 100 such as guide foot 110 which is used in a per se known manner to guide tire 106 onto wheel 108 as wheel is rotated by motor 69 or 71. Guide foot 110 may be horizontally manipulatable along axis 114 by way of actuator 112. By enabling guide foot 110 to be manipulatable along axis 114, guide foot 110 can be adjusted to accommodate wheel sizes of different diameters. Although the embodiment of FIGS. 5 and 6 shows motor 71 coupled to the top portion 93 of threaded drive shaft 90 (see FIG. 4), the rotation of working apparatus 73 may also be powered by one or more motors 69 located within wheeled cart 42, 66. The wheeled cart 42, 66 depicted in FIG. 6 is an embodiment that carries two tire/wheel assemblies. FIG. 5 shows a tire/wheel pair positioned ready to be joined (i.e. mounted) to one another, and the left-most tire/wheel pair shown in FIG. 6 shows a tire/wheel pair after tire mounting work station 50 has mounted tire 106 to wheel 108.

Figure 7:
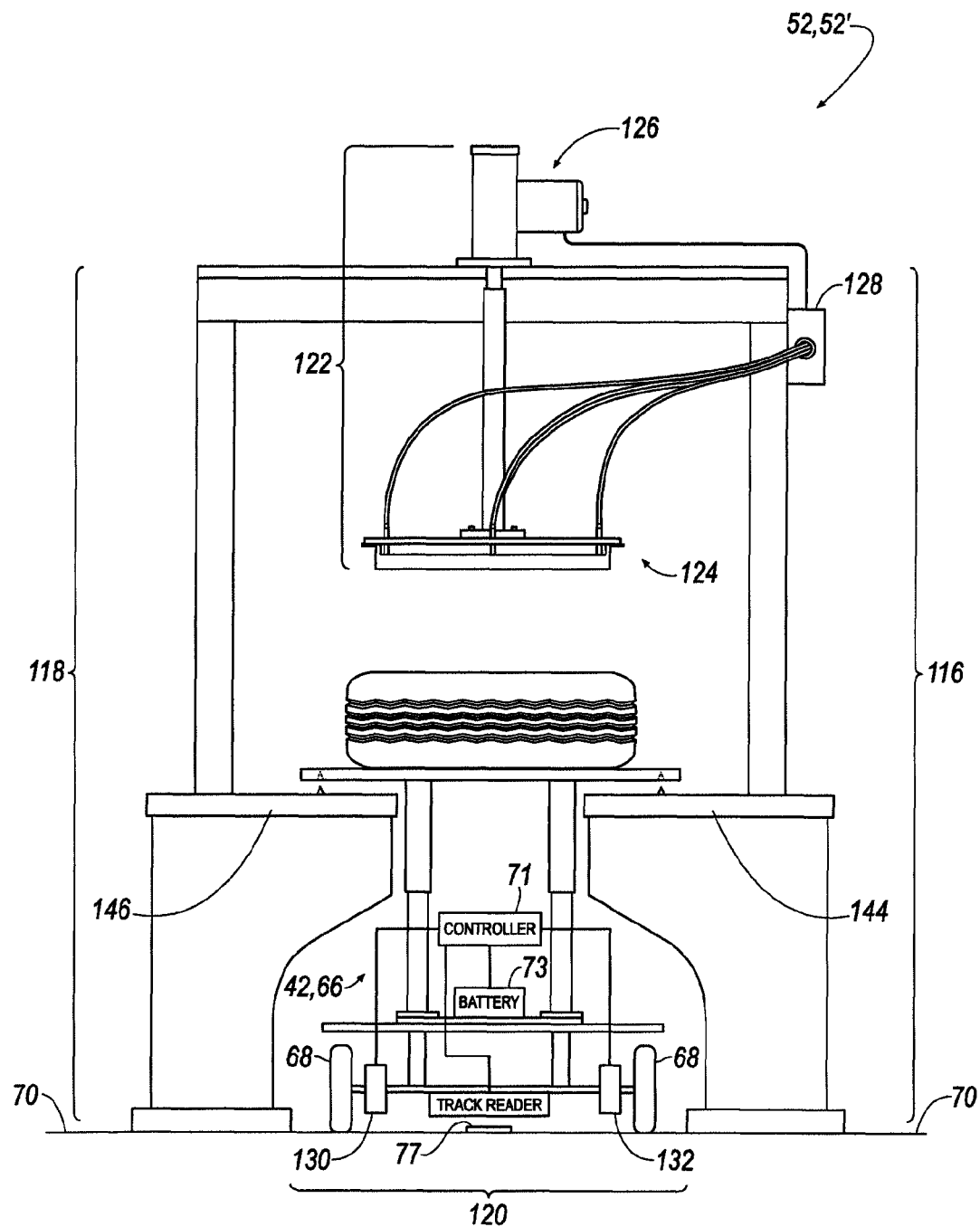
FIG. 7 is a schematic view of another embodiment of a wheeled cart having telescoping support legs.

Now referring to FIG. 7, in yet another embodiment of a work station, tire inflation work station 52, 52' includes a right segment 116 of tire inflation work station 52, 52' and a left segment 118 of tire inflation work station 52, 52'. Right and left segments 116, 118 are spaced apart 120 to create a space therebetween sufficient to accept wheeled cart 66. The work stations can carry any number of working devices 122 and, for example, the work station of FIG. 7 carries a tire inflation apparatus 124 the details of which are not critical to the present invention. In addition to carrying tire inflation apparatus 124, working device 122 can also include a motor 126 and a controller 128 for manipulating and controlling the tire inflation apparatus 124 during operation. Wheeled cart 66 can be powered by battery 73 which is controlled by controller 71. Controller 71 can interface with one or more wheel drive motors 130, 132 to propel wheeled cart 66 along track 77.

Figure 8:
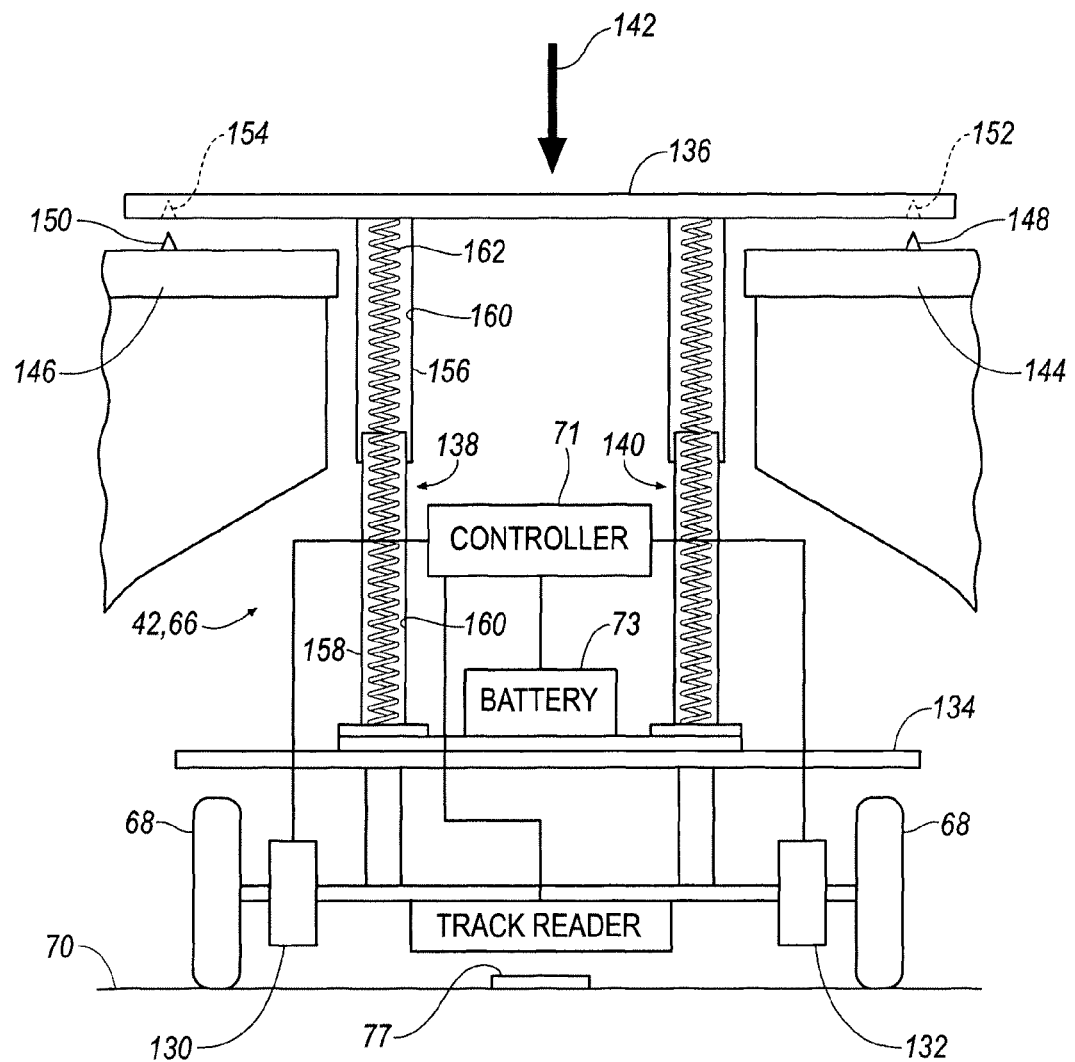
FIG. 8 is a partial cross sectional view of FIG. 7.

Now referring to FIGS. 7 and 8, wheeled cart 66 can be constructed with one or more vertical supports 138, 140 which extend between cart base 134 and cart work surface 136. Vertical supports 138, 140 may be collapsible so that when a load 142 of sufficient magnitude is placed upon cart work surface 136, vertical supports 138 and 140 collapse (i.e. compress).

Right and left segments 116, 118 include respectively associated load bearing surfaces 144, 146. Each load bearing surface, 144, 146 includes a respectively associated engagement member 148, 150 which is adapted to engage a respectively associated mating engagement member 152, 154 associated with cart work surface 136. Although engagement members 148, 150 are shown as male projections and engagement members 152, 154 are shown as female depressions located within cart work surface 136, and any number of different geometries may be used to positively locate cart work surface 136 against load bearing surfaces 144, 146 when cart work surface 136 is depressed by load 142. One embodiment of vertical support members 138, 140 includes using two or more tubular telescoping members 156, 158 which are sized appropriately such that one of the members 158 is telescopically received within an adjacent member 156. Telescoping members 156, 158 can include a hollow central passageway 160 wherein an urging device 162 can reside. Urging device 162 can include a mechanical coil spring, compressed gas cylinder, or any other means effective for expanding telescopic members 156, 158 once load 142 is removed. In an embodiment, telescoping members 156, 158 may comprise the outer housing of a gas cylinder and passageway 160 may be charged with a compressed gas.

The operation of a work station (exemplified by 52, 52') in conjunction with wheeled cart 42, 66 will now be explained in conjunction with FIGS. 9 and 10.

Once wheeled cart 42, 66 is properly positioned within opening 120 of work station 52, 52', working device 122 can be engaged to do its work upon work piece 164. In the example of FIGS. 9 and 10, work station 52, 52' is a tire inflation work station and work piece 164 is a tire which has been mounted to a wheel but has not yet been inflated.

In order for work station 52, 52' to inflate tire 164, working device 122 must be manipulated by controller 128 to lower inflation head 166 into operative engagement with work piece 164. This lowering operation 168 is accomplished by motor 126 and its associated drive mechanism 170.

Figure 9:
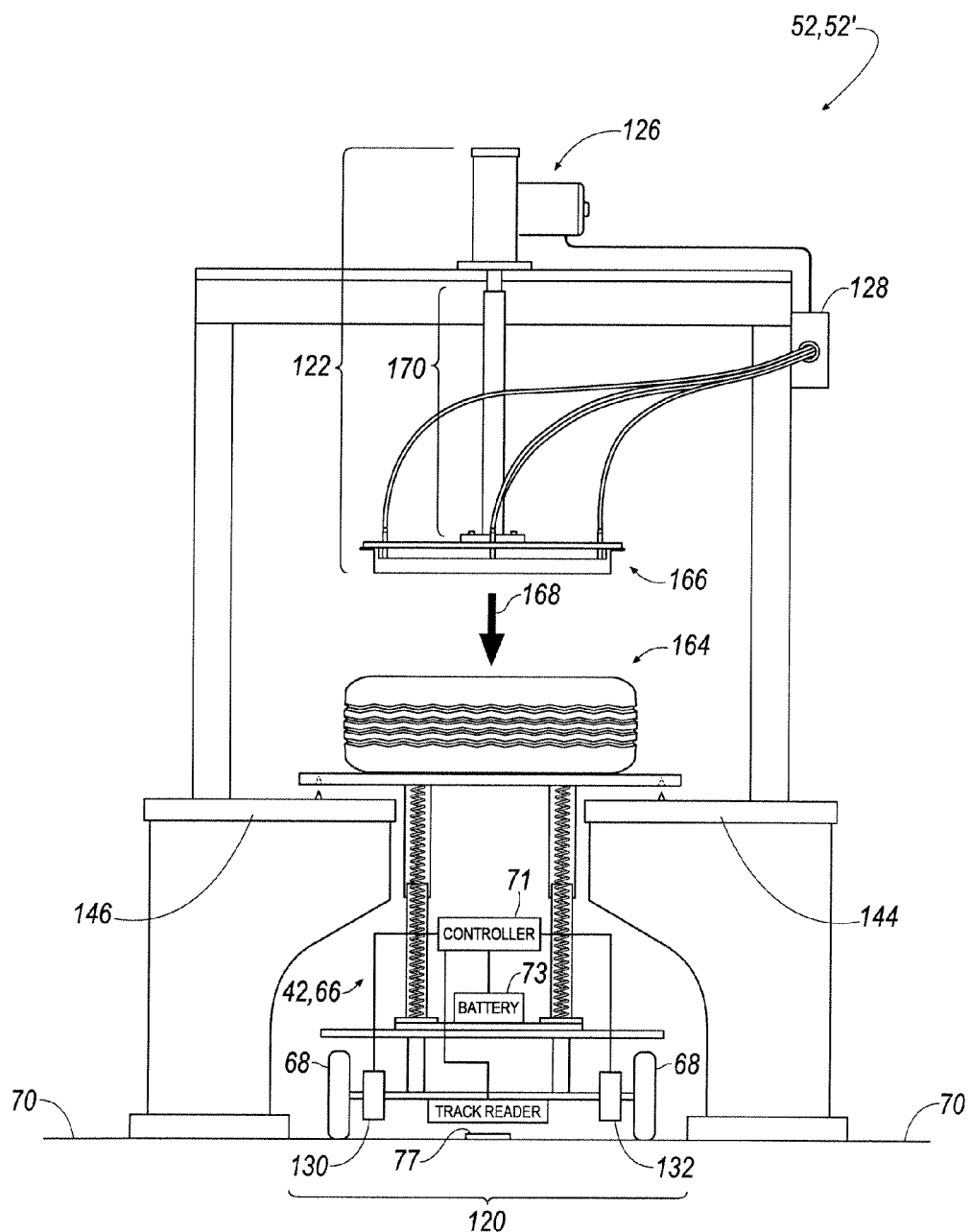
FIG. 9 depicts a first operational stage of locating the wheeled cart of FIGS. 7 and 8 at a work station.
Figure 10:
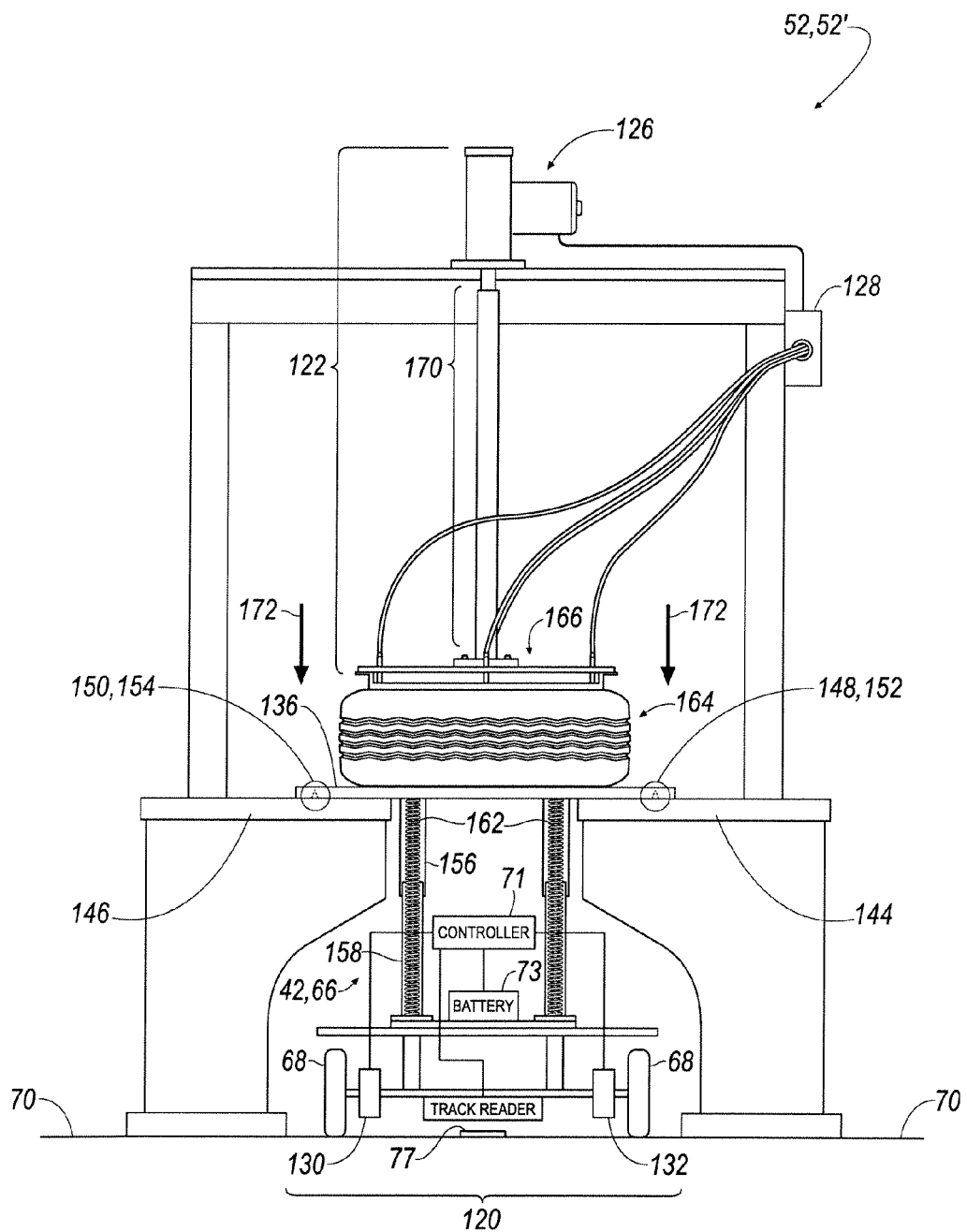
FIG. 10 depicts a second operational stage of loading a work surface of a wheeled cart.

Now referring to FIGS. 9 and 10, the strength of spring means 162 is designed such that it is sufficient to support work piece 164 in an extended position such that cart work surface 136 easily clears (i.e. is elevated above) load bearing surfaces 144, 146. However, urging device 162 is sized so that when the downward thrust 172 of working device 122 is exerted upon work piece 164, urging device 162 is not sufficiently strong to resist the downward thrust 172 thereby resulting in the compression of telescoping members 156, 158. This compression of members 156, 158 causes cart work surface 136 to move downwardly until cart work surface 136 engages load bearing surfaces 144, 146. At that point, cart work surface 136 ceases any further downward movement because any further load exerted by working devices 122 is absorbed by load bearing surface 144, 146 and not by members 156, 158. The proper alignment of paired engaging means 148, 152 and 150, 154 ensures that there will be no lateral shift of cart work surface 136 during the course in which working device 122 performs work upon work piece 164. It is important to note that if mating pairs of engagement means are cone shaped (see 144, 152) they promote/guide self alignment as surface 136 drops. Accordingly, cart 42, 66 does not have to be precisely aligned within space 120. It merely must be within a zone that is defined by the geometry of paired engaging means 148, 152 and 150, 154. In view of the above referenced description, it is easily understood that wheeled cart 66 can be constructed from much lighter materials than would be otherwise possible if the structure of cart 42, 66 were responsible for bearing all of the working load exerted by working device 122 on work piece 164.

Figure 11:
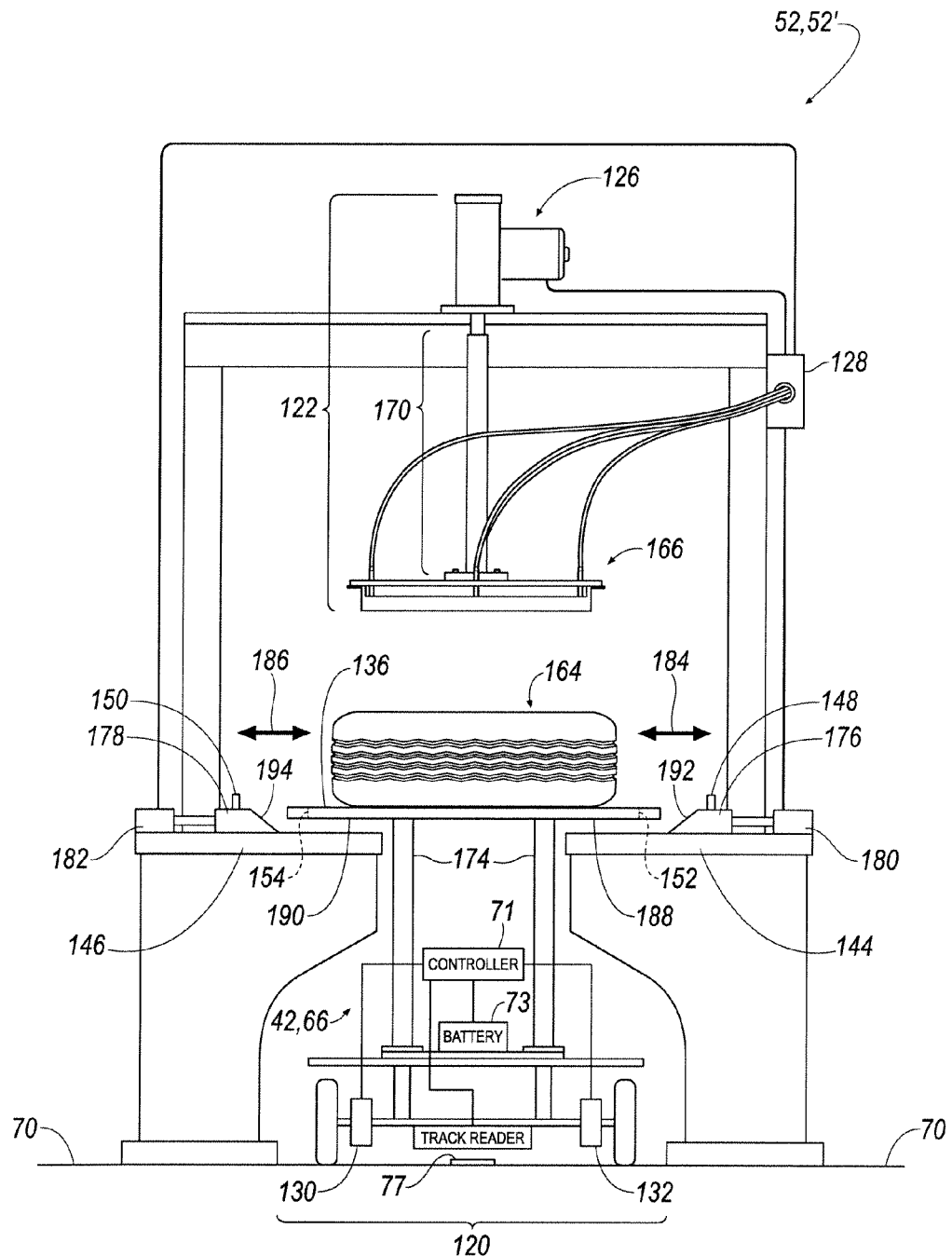
FIGS. 11-13 depict a second system for loading a work surface of a wheeled cart.
Figure 12:
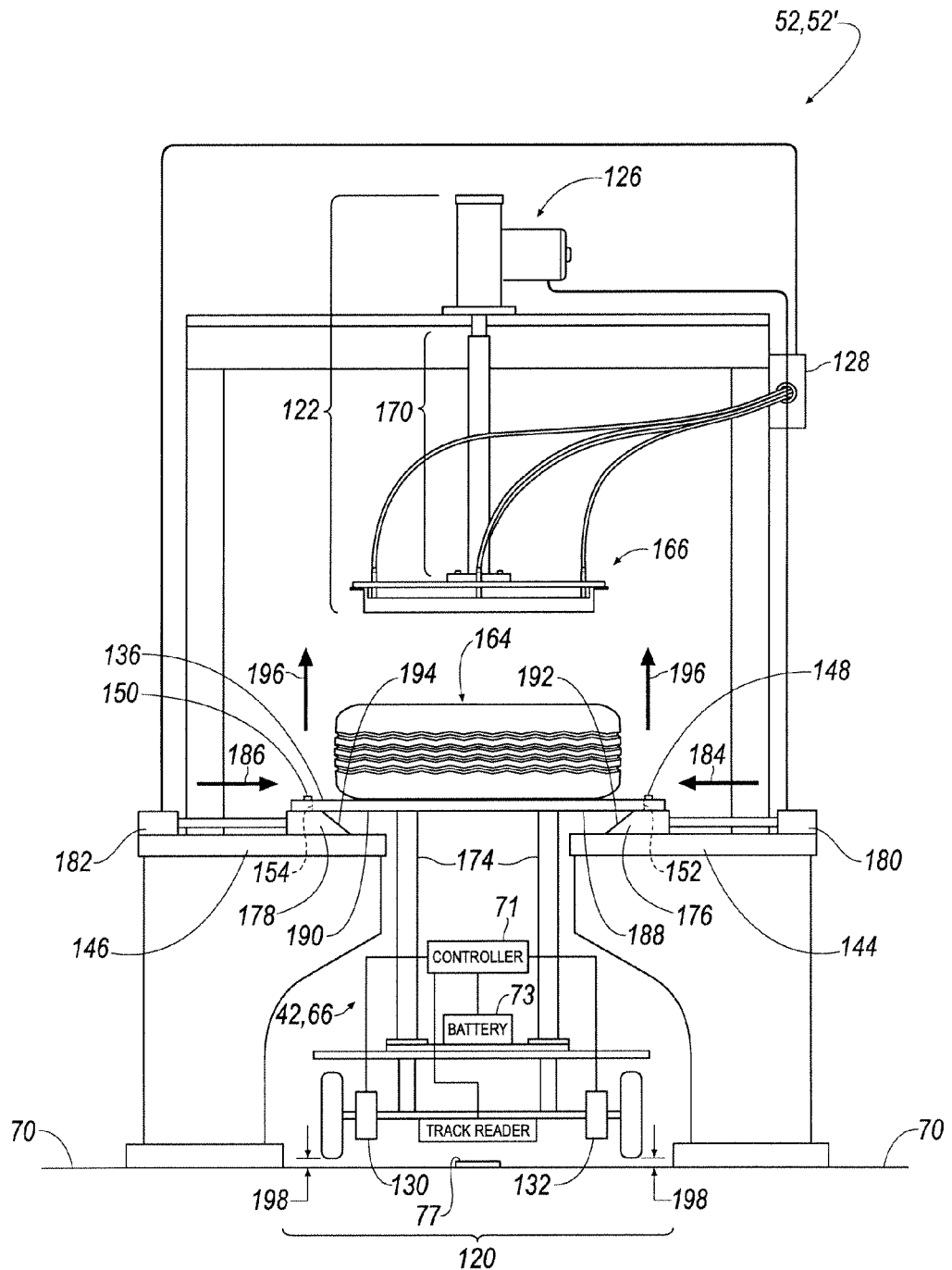
Figure 13:
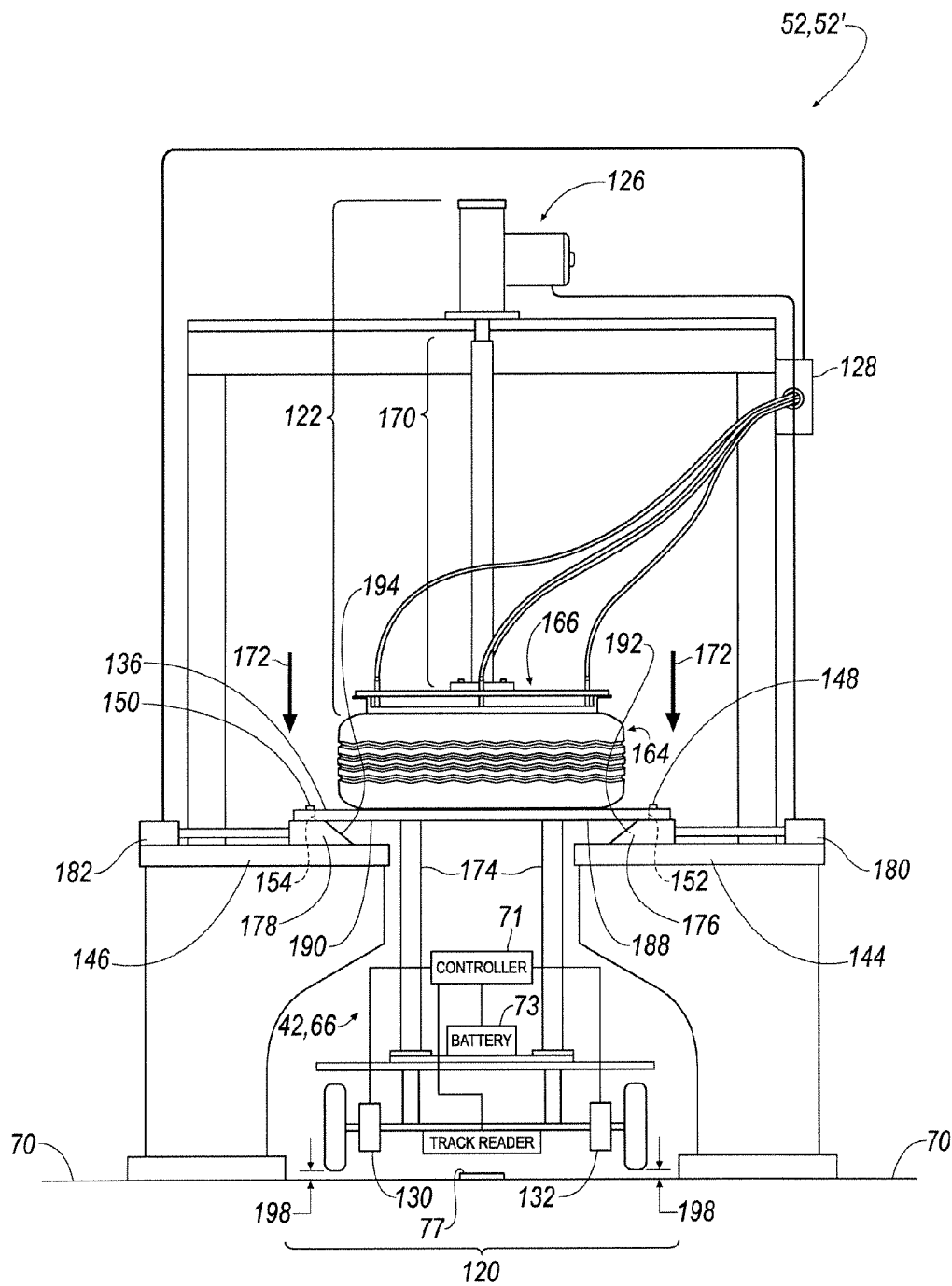

FIGS. 11-13 depict another embodiment of the wheeled cart of the present invention. Now referring to FIGS. 11-13, wheeled cart 42, 66 is constructed with rigid (i.e. non-collapsible, non-extendable) legs. Work station 52, 52' includes one or more sliding wedges 176, 178 which are vertically manipulatable along a respectively associated portion of load bearing surface 144, 146. Sliding wedges 176, 178 can be activated using any number of known actuator mechanisms 180, 182 such as hydraulic cylinders, pneumatic cylinders, electric motors and the like. Mechanisms 180, 182 are effective for vertically sliding 184, 186 their respectively associated sliding wedges 176, 178 under a bottom portion 188, 190 of cart work surface 136.

Now referring to FIGS. 11 and 12, when mechanisms 180, 182 are activated by controller 128 to extend their respectively associated wedges 176, 178 under a bottom surface 188, 190 of cart work surface 136, the include face 192, 194 of each wedge 176, 178 forms a lifting ramp and moves cart work surface 136 upwardly 196. Because legs 174 are rigid (non-collapsible or non-extendable), the entire wheeled cart assembly 42, 66 is elevated 198 from the load bearing surface 70 as is shown in FIG. 12. Once wheeled cart 66 is elevated from load bearing surface 70, inflation head 166 can be lowered 172 and can be used to operate upon work piece 164 (see FIG. 13). In doing so, none of the downward thrust exerted by working device 122 is born by the wheels 68 or the legs 174 of wheeled cart 42, 66 inasmuch as all of the downward thrust exerted by working device 122 is born by load bearing surfaces 144, 146 by way of sliding wedges 176, 178. Each sliding wedge 176, 178 can include a respectively associated engagement means 148, 150. Also, cart work surface 136 can be fashioned with one or more complimentary (i.e. mating) engaging means 152, 154 which are respectively associated with engaging means 148, 150. Engaging means pair 148, 152 and 150, 154 are adapted to engage one another while wheeled cart 42, 66 is lifted 198 from load bearing surface 70 in order to prevent the lateral movement of cart work surface 136 throughout a period of time in which working device 122 operates on work piece 164.

Figure 14:
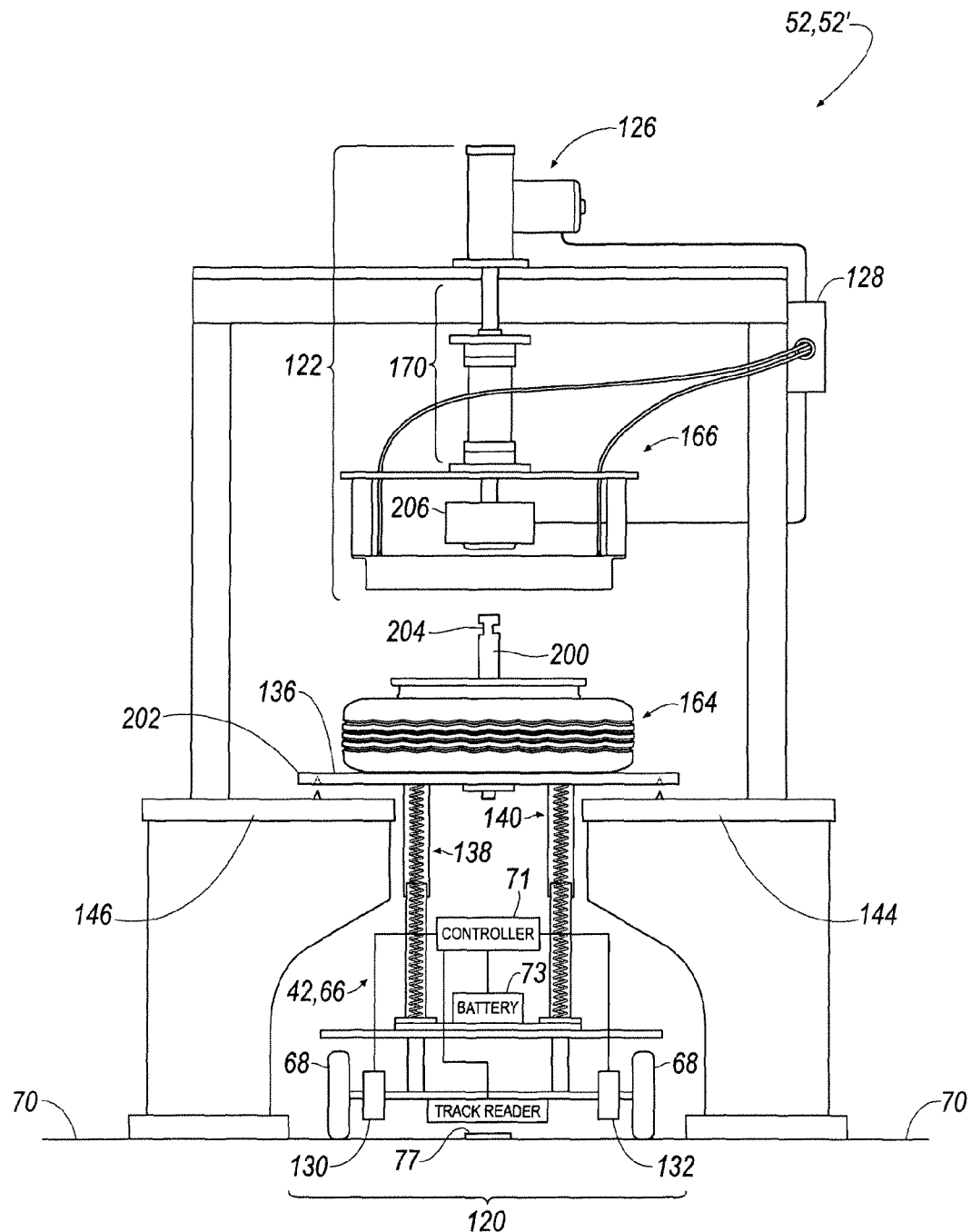
FIGS. 14-16 depict a third system for loading a work surface of a wheeled cart.
Figure 15:
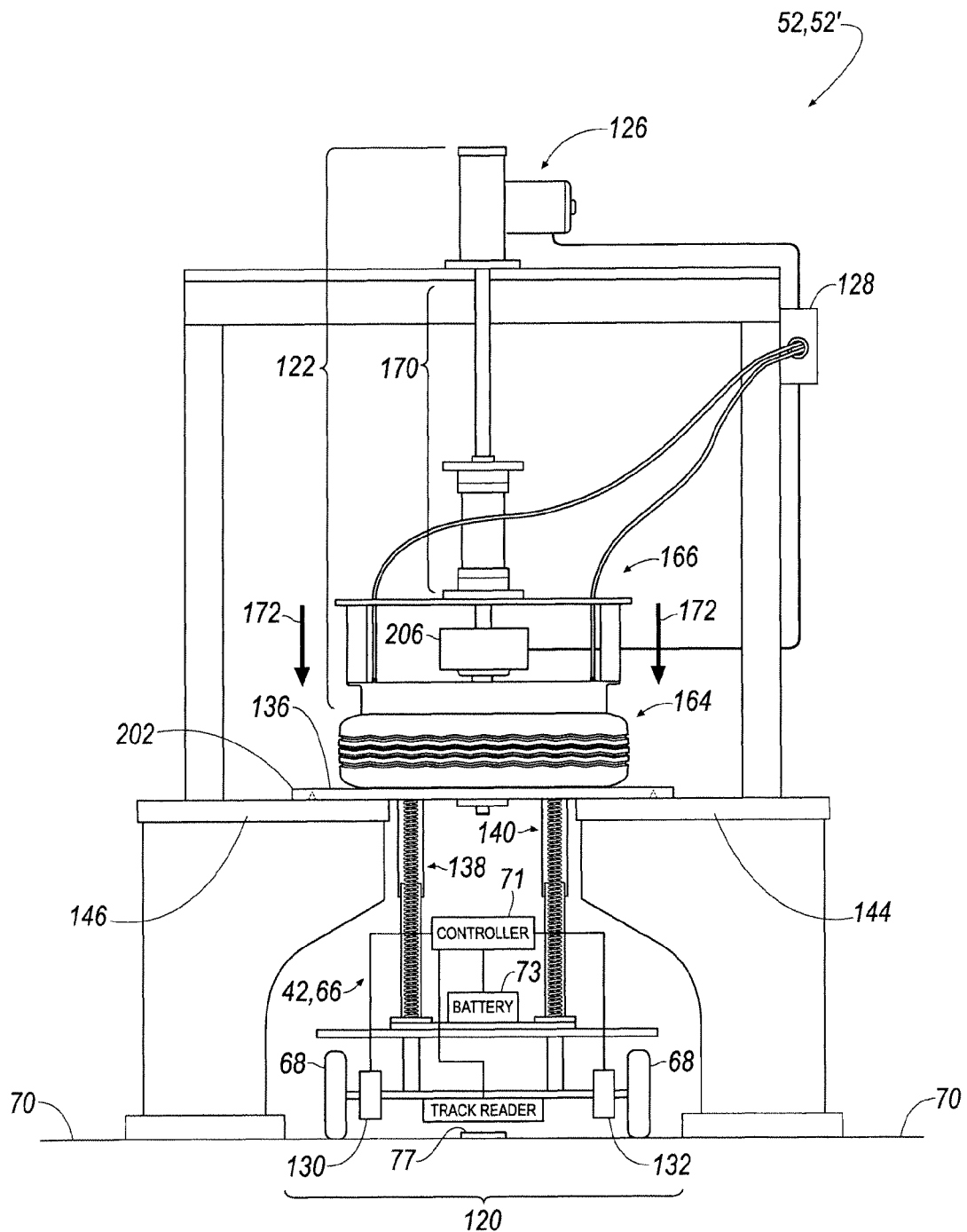
Figure 16:
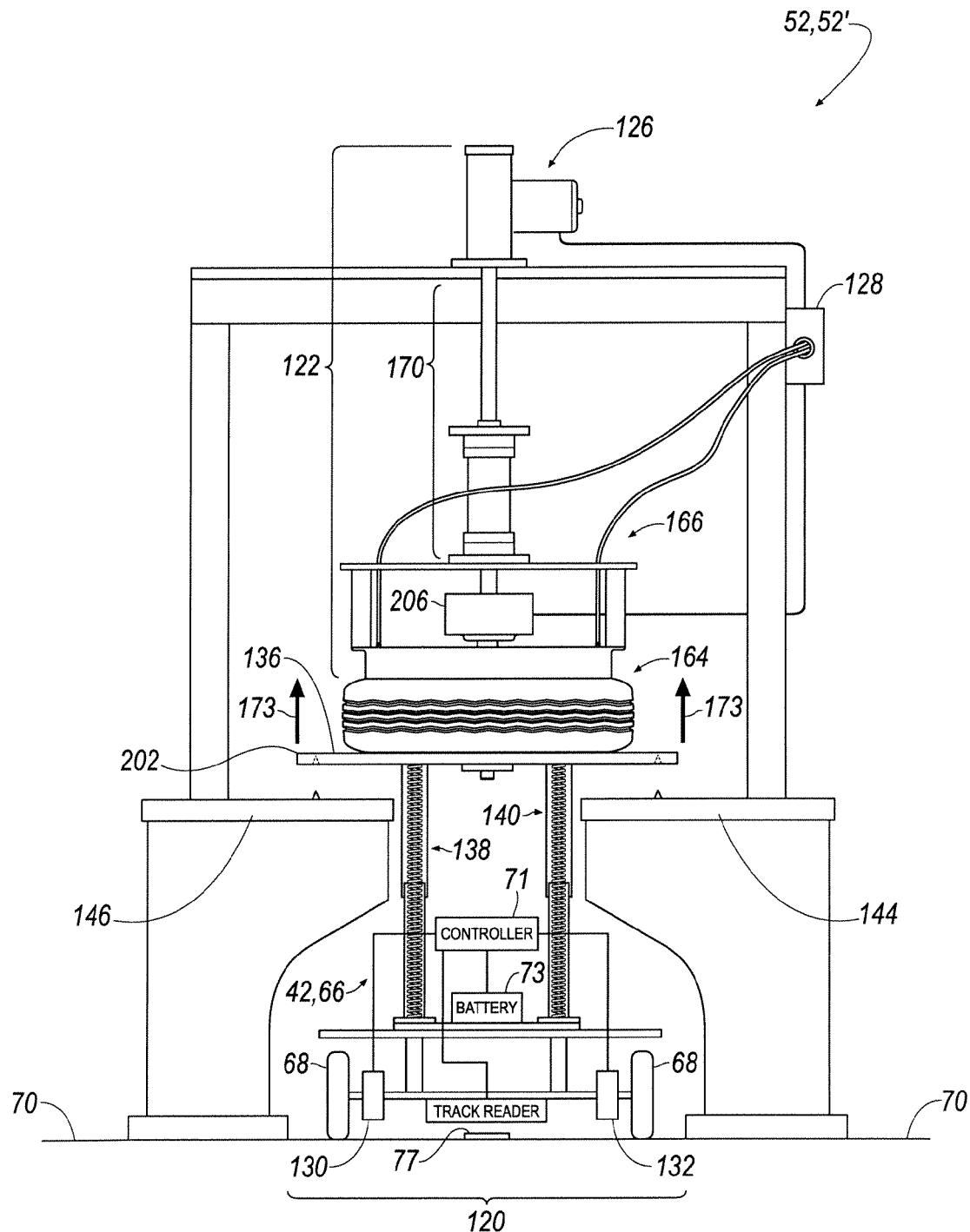

In yet another embodiment of wheeled cart 42, 66, cart 42, 66 (see FIG. 14) is fashioned with telescoping vertical supports 138, 140. Telescoping vertical supports 138, 140 have already been described in conjunction with the cart shown in FIGS. 7-10. Cart 42, 66 includes rigid, vertical post 200 which is firmly secured to cart work surface 136. Vertical post 200 may extend through the hollow center portion of work piece 164, or in an alternative embodiment, vertical post 200 may extend from cart work surface 136 along an outer edge region of cart work surface 136. Vertical post 200 can be fashioned with a notch 204 and working device 122 may include a notch engaging mechanism 206. When working device 122 is activated, inflation head 166, is lowered 172 against work piece 164. Notch engaging mechanism 206 is controlled by controller 128, and it is adapted to engage notch 204 thereby securely joining working device 122 with vertical post 220 (see FIG. 15). Next, working device 122 is activated such that it lifts 173 vertical post 200 upwardly (see FIG. 16). Because vertical post 200 is rigid and firmly attached to cart work surface 136, cart work surface 136 also lifts upwardly. Telescopic legs 138, 140 permit the upward movement of cart work surface 136 while allowing the wheels 68 of wheeled cart 66 to remain engaged against load bearing surface 70. It is easily seen that by utilizing the rigid, vertical post 200 in conjunction with the lifting mechanism in working device 122, that any downward thrust exerted by working device 122 upon work piece 164 is absorbed by vertical post 200 and is not born by the telescoping leg portions 138, 140 or the wheels 68 of wheeled cart 66.

Figure 17:
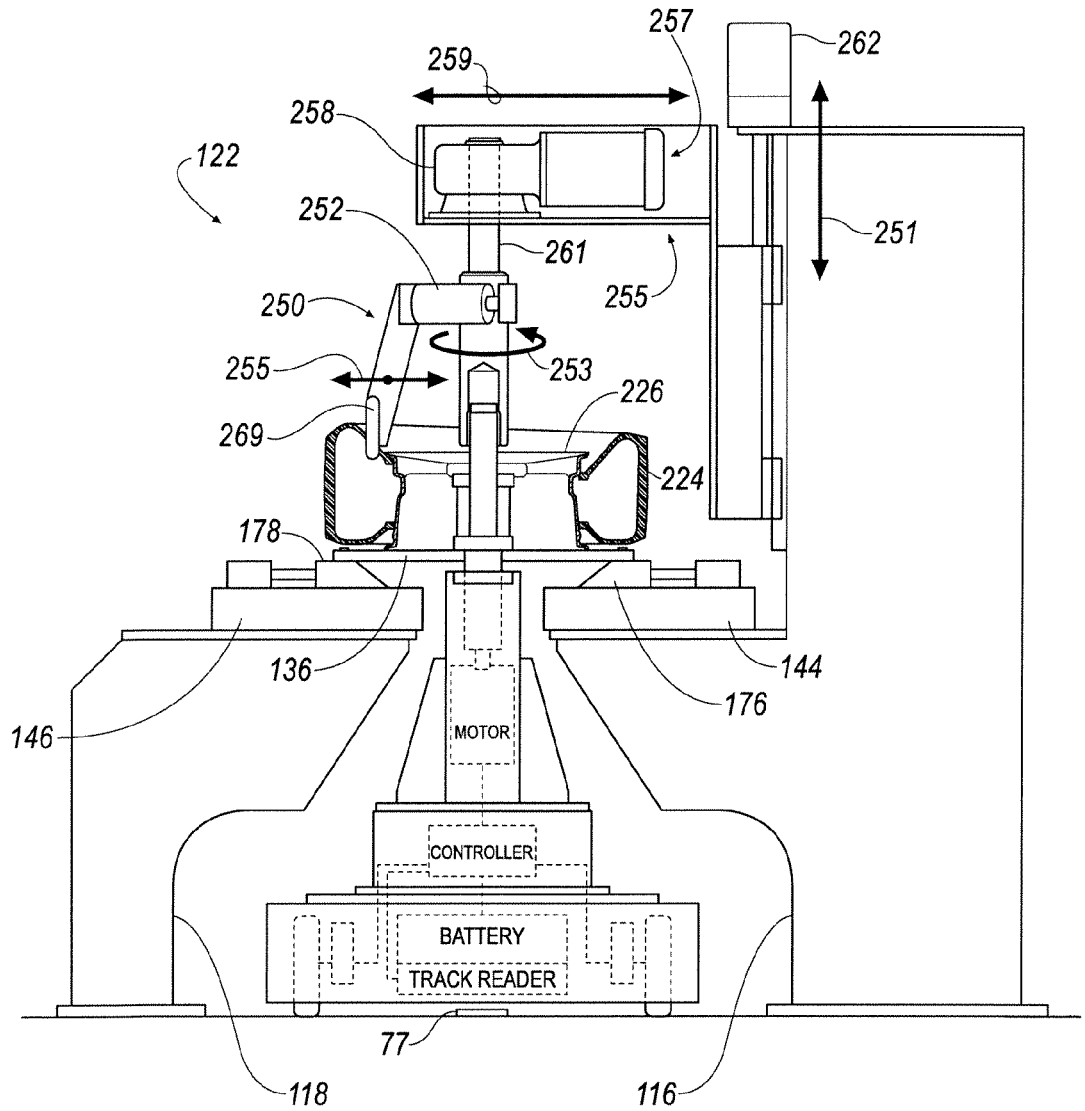
FIG. 17 is a front elevational view of a third embodiment of the wheeled cart stationed at an embodiment of a tire/wheel mounting work station.

Now referring to FIG. 17, wheeled cart can be positioned at tire/wheel mounting work station 50, 50'. Work station 50, 50' includes working device 122 which, in the present example, is a tire/wheel mounting working device. Working device 122 may have a motor 257 for rotating working arm assembly 250 (working arm assembly is shown in greater detail in FIG. 19). In an alternative embodiment, assembly 250 may be rotationally fixed and the wheel 226 may instead by rotated. Motor 257 is coupled to drive mechanism 258. Drive mechanism 258 is effective for coupling the rotational movement of motor 257 to shaft 261. Drive mechanism 258 may include a worm gear drive, a spur gear drive or the like. Both motor 257 and drive mechanism 258 are preferably coupled to a common platform 255 which in turn, is coupled to vertical drive motor 262. Vertical drive motor 262 is effective for vertically manipulating 251 the vertical position of shaft 261, drive mechanism 258, motor 257 and platform 255. In applications where it is desirable, platform 255, motor 257, drive mechanism 258, and shaft 261 may be horizontally manipulated 259 by implementing any known linear drive technique.

Figure 19:
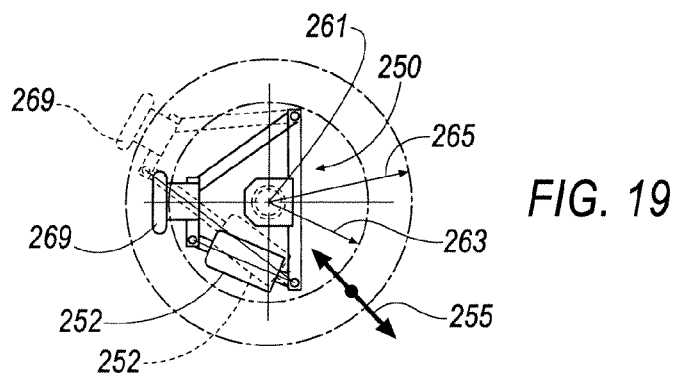
FIG. 19 is a top view of an embodiment of a radially adjustable working head used on the work station of FIG. 17.
Figure 18:
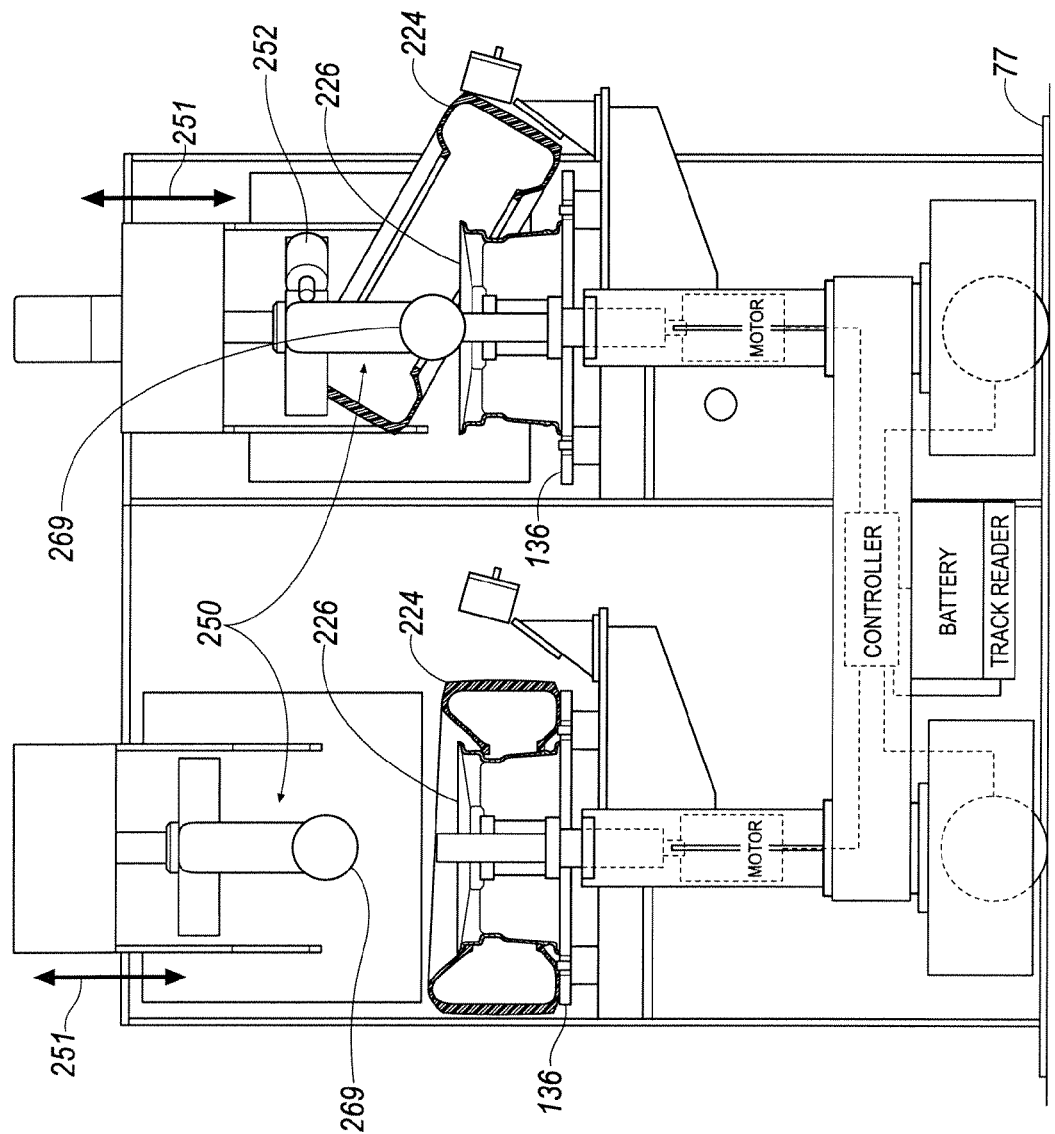
FIG. 18 is a side elevational view of FIG. 17.

Now referring to FIGS. 17-19, shaft 261 is coupled to working arm assembly 250. Working arm assembly 250 is fixed to and rotates 253 with shaft 261. Working arm assembly 250 includes at least one arm that is extendable by way of an extension cylinder 252. Extension cylinder 252 when it is in a minimum extended state is effective for extending a working end (e.g. roller member 269) to a first radial position 263. When extension cylinder 252 is extended to a maximum state, it is effective for positioning roller member 269 in a second radial position 265. Other radial positions intermediate first radial position 263 and second radial position 265 may be accomplished by activating extension cylinder 252 to a position intermediate the minimum and maximum states. The presence of extension cylinder 252 in conjunction with the other pivoting members which make up working arm assembly 250 allow wheel member 269 to be adjusted to any number of radial positions 255. This adjustability allows the roller member 269 to accommodate a plurality of wheel sizes simply by adjusting the extension or contraction state of extension cylinder 252. This adjustability of wheel member 269 to circumscribe any number of wheel diameters is important in tire/wheel mounting applications wherein wheel member 269 is the primary working member to effect the mounting of the tire to the wheel. Such mounting techniques are known in the art.

Figure 20:
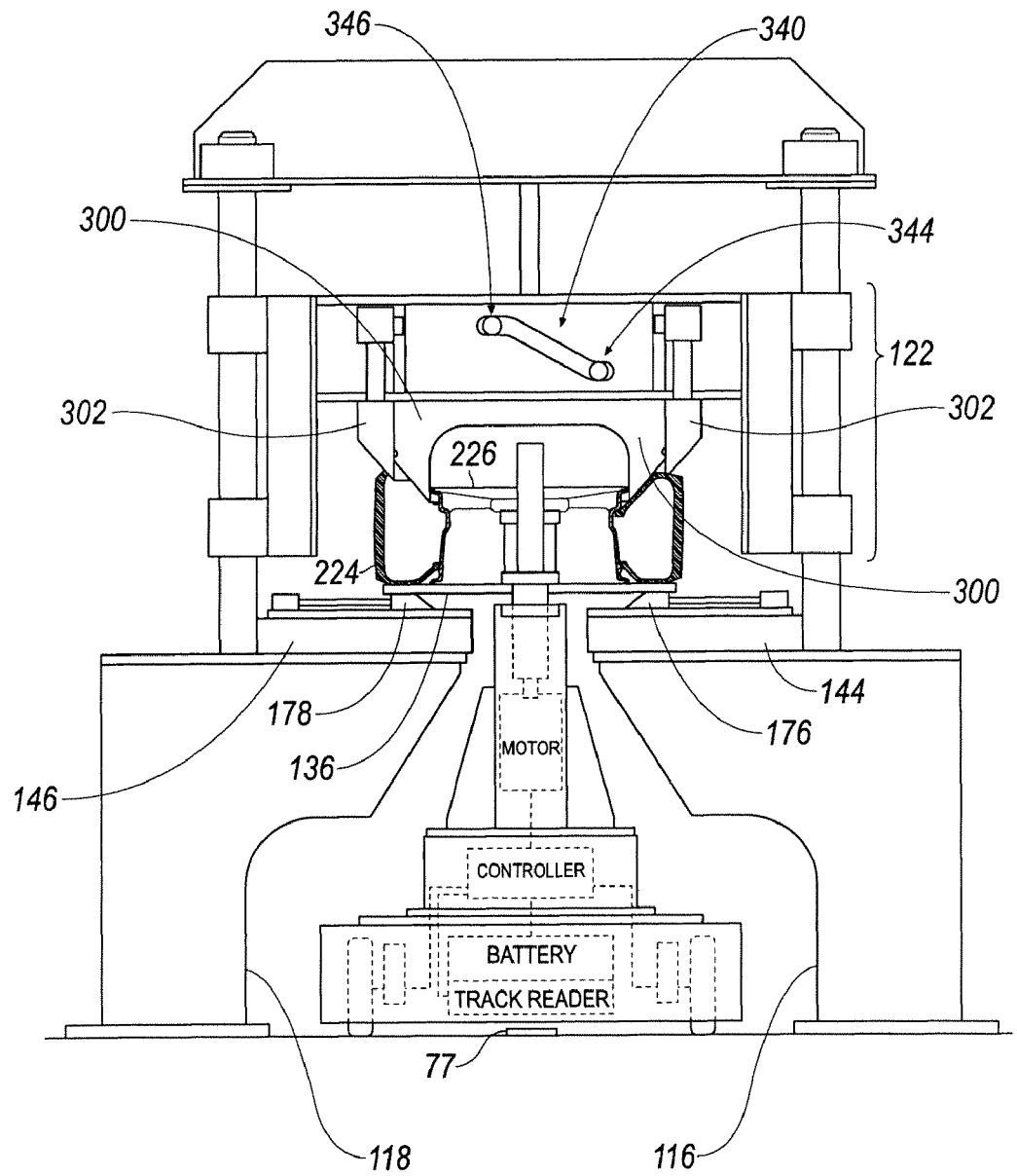
FIG. 20 is an embodiment of a work station fitted with a cam-operated working head.
Figure 21:
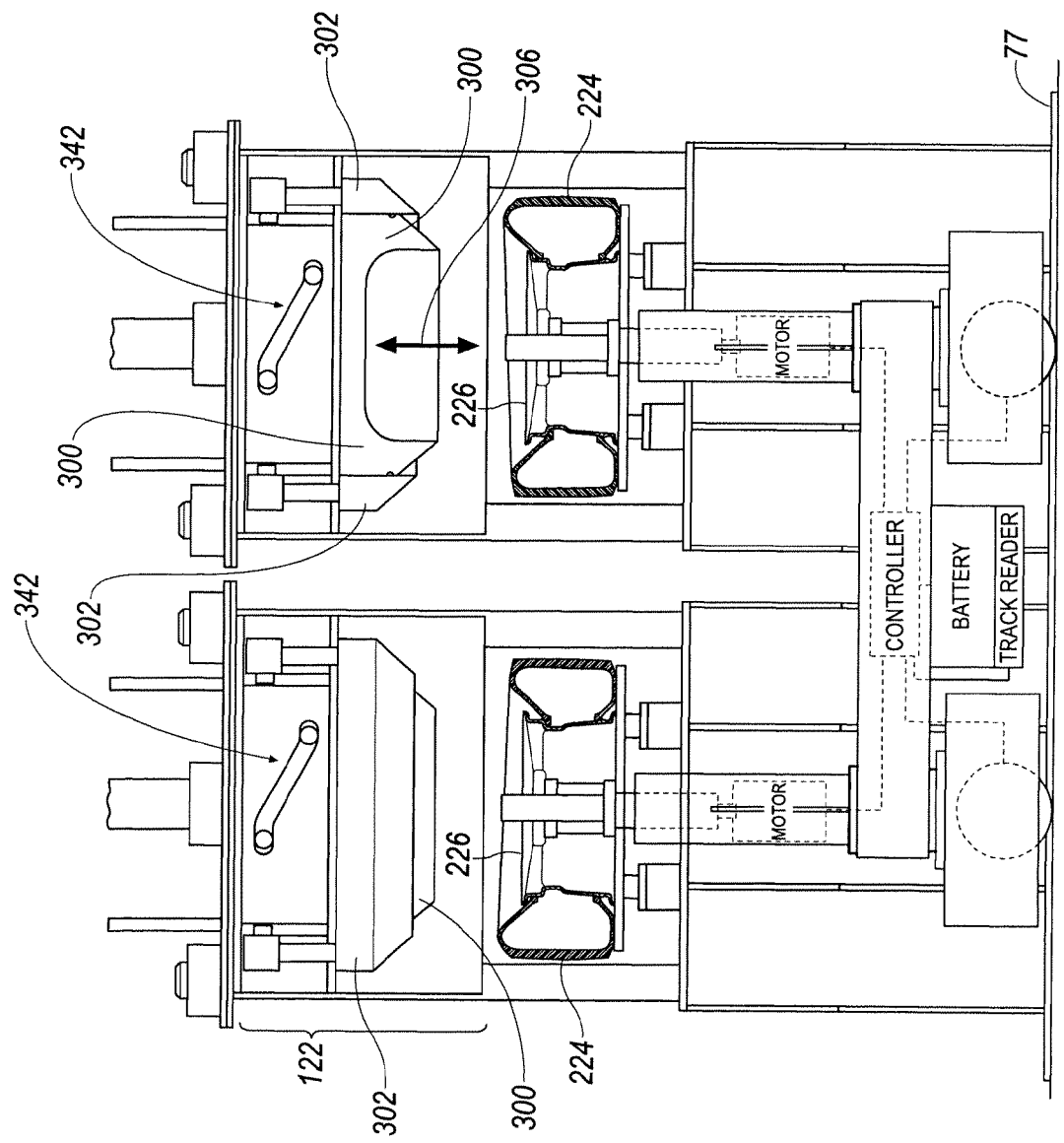
FIG. 21 is a side elevational view of FIG. 20.

Now referring to FIG. 20, in yet another embodiment of a tire inflation work station, working device 122 includes a first inflation head 300 that is adapted to inflate tire/wheel assemblies of a first diameter. First inflation head 300 is telescopically nested within second inflation head 302 which is adapted to inflate tire/wheel assemblies of a second diameter. Heads 300, 302 can be carried by a common platform which is vertically displaceable. At least one of the inflation heads 300, 302 is adapted to be vertically manipulated 306 with respect to the other inflation head. This manipulation can be carried out by way of one or more cam lift mechanisms 340, 342 that are positionable between a first latch position 344 and a second latch position 346. When cam mechanism 340 is manipulated into the first latch position 344, first inflation head 300 is positioned in the extended position thereby enabling it to be placed in operational engagement with the tire/wheel assembly and allowing head 300 to be used to inflate the tire/wheel assembly. When cam mechanism is in the second latch position 346, first inflation head 300 is manipulated upwardly (i.e. in a retracted position) thereby exposing second inflation head 302 to extend beyond head 300. This places head 302 in a position to operatively engage the tire/wheel assembly to be inflated. The manipulation of cam members 340, 342 can be actuated manually or it can be done by way of automated means (such as by pneumatic, electric or hydraulic motors). Automated means as well as cam linkages in general are well known to those skilled in the art.

Figure 22:
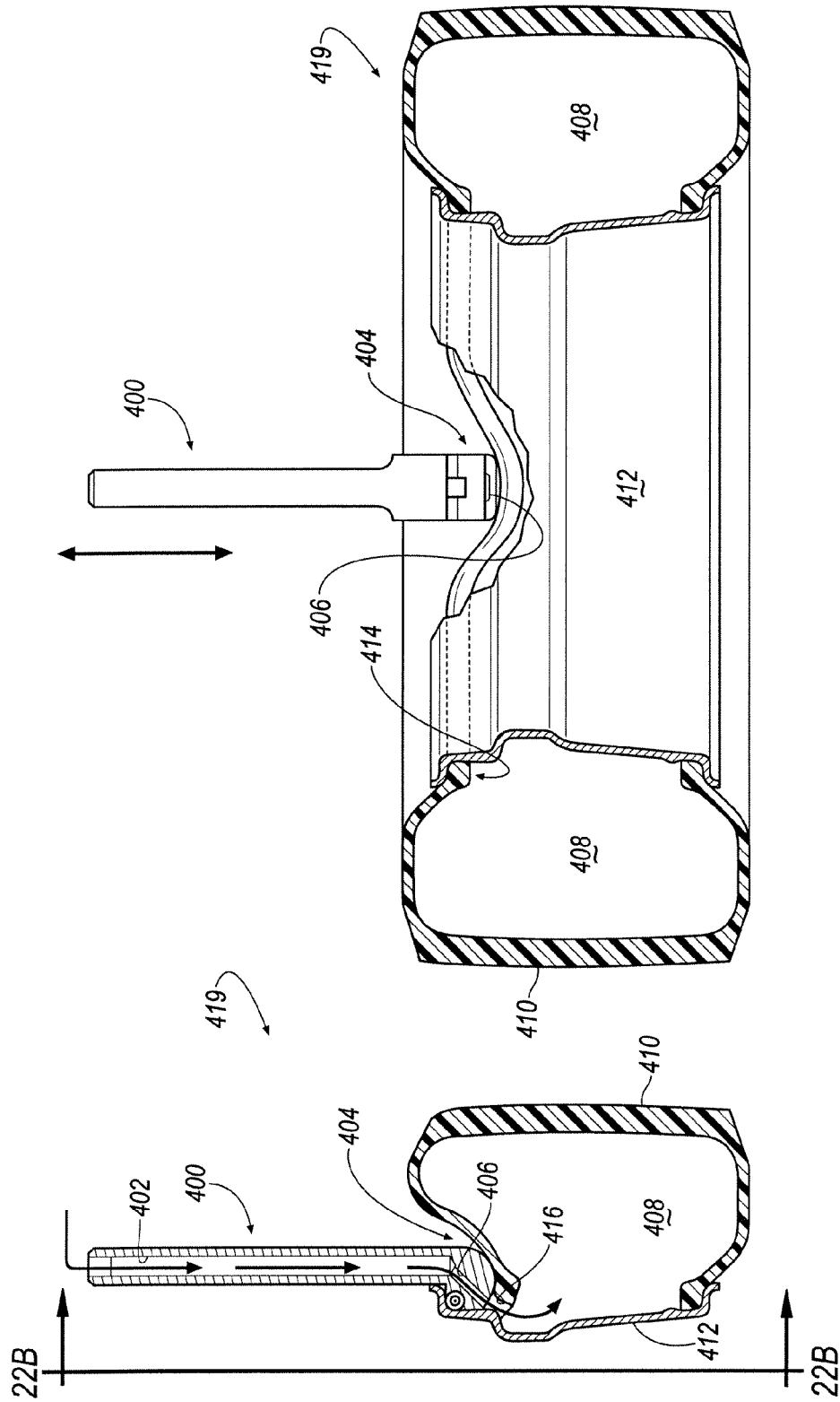
FIG. 22A is a front elevational view of an embodiment of a tire inflation apparatus.
FIG. 22B is a side elevational view taken along lines 22B-22B of FIG. 22A.

Now referring to FIGS. 22A and 22B, one system for inflating a tire/wheel assembly is to use an inflation probe 400 which can be attached to a working device 122 (not shown) of a work station (not shown). Inflation probe 400 can have a generally tubular body with an air passage conduit 402 formed within the body of the inflation probe 400. Inflation probe 400 can terminate into a head portion 404 that is formed to have an outer contour that generally matches the tire contour when the tire is depressed by the head portion 404 of inflation probe 400. The contour of head portion 404 may be specifically designed and contoured for a given tire design inasmuch as tire wall thicknesses and tire materials may differ in rigidity and stiffness. Head portion 404 is fitted with an internal secondary conduit 406. Secondary conduit 406 is connected to conduit 402 and is effective for delivering air into the inner portion 408 of tire/wheel assembly 419. The primary advantage that inflation probe 400 has over traditional ring style inflators is twofold. Firstly, traditional inflators use a ring to introduce air 360 degrees around the gap 416 formed between the wheel and the tire. During inflation, the tire generates large upward forces against the ring. In order to resist these upward forces generated during inflation, the work station must be constructed from extremely heavy materials. Secondly, control timing is critical with ring inflators (if the ring is removed prematurely, loud noises are generated by the rush of escaping air).

Using inflation probe 400 simplifies the inflation process inasmuch as it is placed between the wheel and the tire proximate the wheel bead seat and air is passed through conduit 402 and 406. As air passes into chamber 408, tire 410 begins to inflate and seal against the bead seat 414 of wheel 412. Once sufficient air has passed into area 408, inflation probe 400 can be withdrawn from its position between the tire bead and the wheel bead seat and the pressure within chamber 408 will properly seat any remaining portion of the bead of tire 410 against the wheel bead seat of wheel 412.

Figure 23:
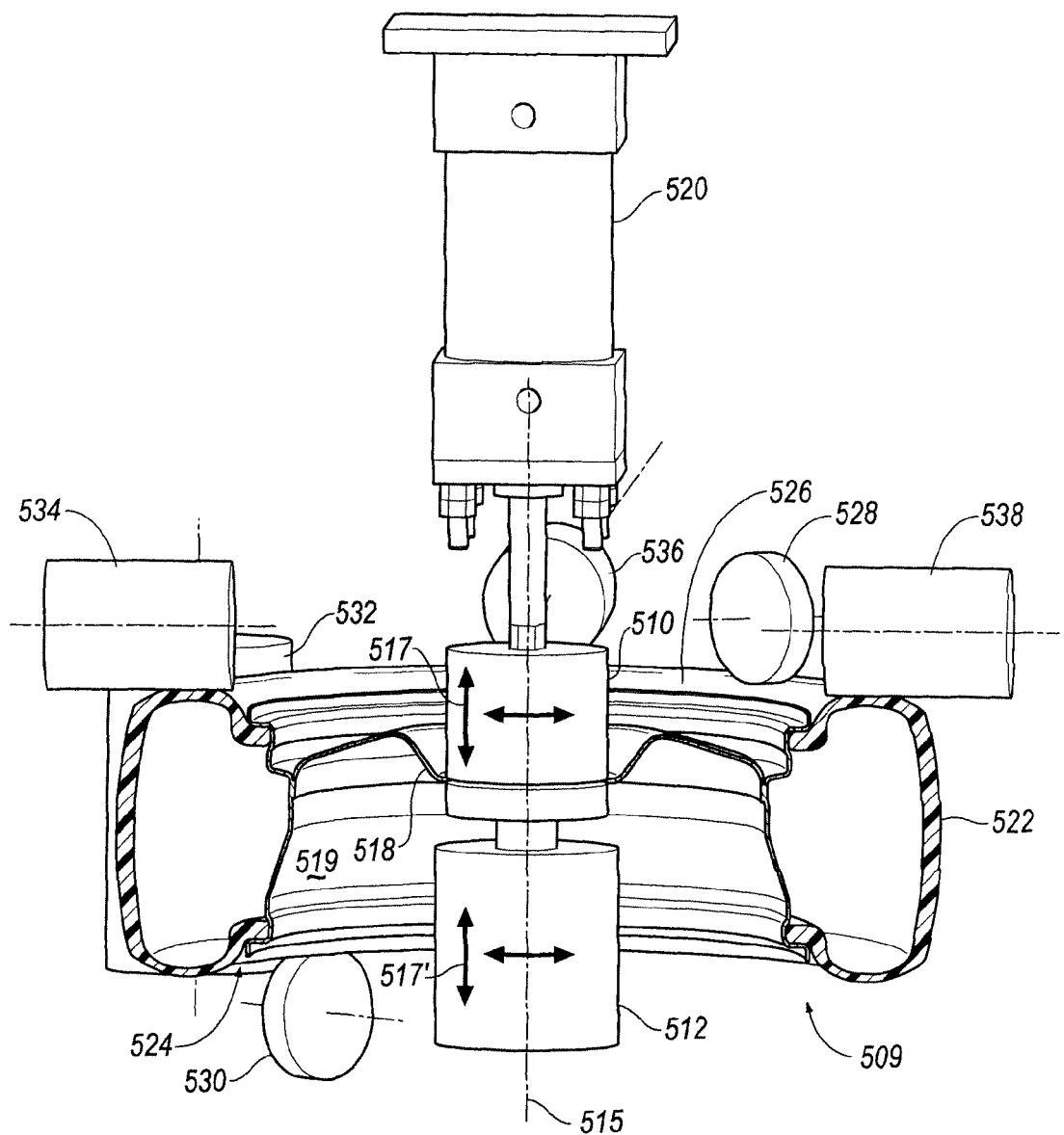
FIG. 23 is a partial cross sectional view of an embodiment of a tire bead seater.

Now referring to FIG. 23, an embodiment of the bead seater apparatus of present invention shown in FIG. 23 includes upper wheel clamp 510 and lower wheel clamp 512. At least one of upper wheel clamp 510 or lower wheel clamp 512 is movable in parallel 517, 517' with the axis of rotation 515 of wheel and tire assembly 509. By being able to manipulate at least one of the upper wheel clamp or lower wheel clamp 510, 512 in parallel with axis of rotation 515, wheel clamp assembly 510, 512 is capable of opening a gap therebetween to accept a hub portion of a wheel 518 and (once the hub portion 518 is in proper location), closing upon hub portion 518 such that wheel clamps 510, 512 sandwich hub portion 518 of wheel 519 therebetween positively gripping assembly 509. Movement 517, 517' of clamps 510, 512 can be accomplished by way of overhead cylinder 520. In an alternative embodiment (not shown), cylinder 520 can be placed below assembly 509. Cylinder 520 can accomplish its clamping stroke by way of any number of technologies well known to those skilled in the art including, electric, pneumatic, hydraulic actuators, or the like. Cylinder 520 can be attached to a working device 122 and be made part of a work station as has been discussed herein. Clamp 512 can be made part of a wheeled cart 42, 66 as disclosed herein.

Once clamps 510, 512 have been manipulated to sandwich hub 518 therebetween, the sidewalls 524, 526 of tire 522 are brought into contact with deforming rollers 528, 530. The function of deforming rollers 528, 530 is to temporarily deflect the sidewall of tire 522 inwardly (towards the air filled core of the tire) enough to deflect the bead portion of the tire away from the bead seating portion of wheel 519. In an embodiment, the deforming rollers 528, 530 engage the sidewall of tire 522 as close as possible to the interface portion between the tire sidewall and the bead seat portion of the wheel. It is advantageous for deforming rollers 528, 530 to deflect the bead seating portion of the tire in this vicinity because it is believed that by "flexing" the tire in this vicinity, it disturbs the equilibrium established between the tire bead and the wheel bead seat and this disturbance will cause an improperly seated tire to properly seat. It will also encourage the evacuation of any air bubbles that may be trapped between the tire bead and the wheel bead seat. Although FIG. 523 is shown with only two deforming rollers 528, 530, it is contemplated that the present invention may employ, one, two or more than two deforming rollers. For example, it is contemplated that upper deforming roller 528 may have a counter part upper deforming roller spaced 180 degrees from it (180 degrees with respect to rotational axis 515) and, likewise, it is contemplated that lower deforming roller 530 might have a counterpart roller spaced 180 degrees from it (180 degrees relative to rotational axis 515).

Once deforming rollers 528, 530 are engaged against the sidewalls of tire 522, tire 522 is rotated about its axis of rotation 515. This rotational motion can be imparted to tire 522 in any number of ways including rotating roller 532 which is connected to a drive motor (not shown) and which contacts the tread portion of tire 522. Additional rotational mechanisms can be used such as one or more guide rollers 534, 536, 538. One or more of the guide rollers 534, 536, 538 can be connected to a rotational drive means (not shown) such as an electric motor, pneumatic motor, hydraulic motor or the like wherein the guide roller imparts rotational energy to the tire 522 by way of its sidewall portion 526. Still in another embodiment, one or more the deforming rollers 528, 530 may be coupled to a drive motor or the like to impart rotational energy the sidewall of the tire while they concurrently deform the side wall of the tire as explained above. It is contemplated that the rotational energy imparted to wheel and tire assembly 509 can be accomplished by way of a motor attached to cylinder 520 or to clamp 512

It is contemplated that wheel and tire assembly can be carried on a wheeled cart 42, 66 (such as disclosed herein) from work station to work station and that the apparatus shown in FIG. 23 can be part of a tire bead seating station. Once the robotic cart is in proper location within the tire bead seating station, lower wheel clamp 512 (which is part of the permanent portion of the wheel bead seating station) moves upwardly engaging hub portion 518 thereby lifting wheels 68

(not shown) from the floor. It is contemplated that the upward movement imparted by lower wheel clamp 512 to wheel and tire assembly 9 can also be used to drive the upper side wall portion of tire 522 against guide rollers 534, 536, 538 if such guide rollers are used. These guide rollers, if used, can function to stabilize the tire during its rotation as described above. Once the tire 522 is manipulated against guide rollers 534, 536, 538, deforming rollers 528, 530 and roller 532 (if used) can be manipulated into place to accomplish the bead seating function described above.

Figure 24:
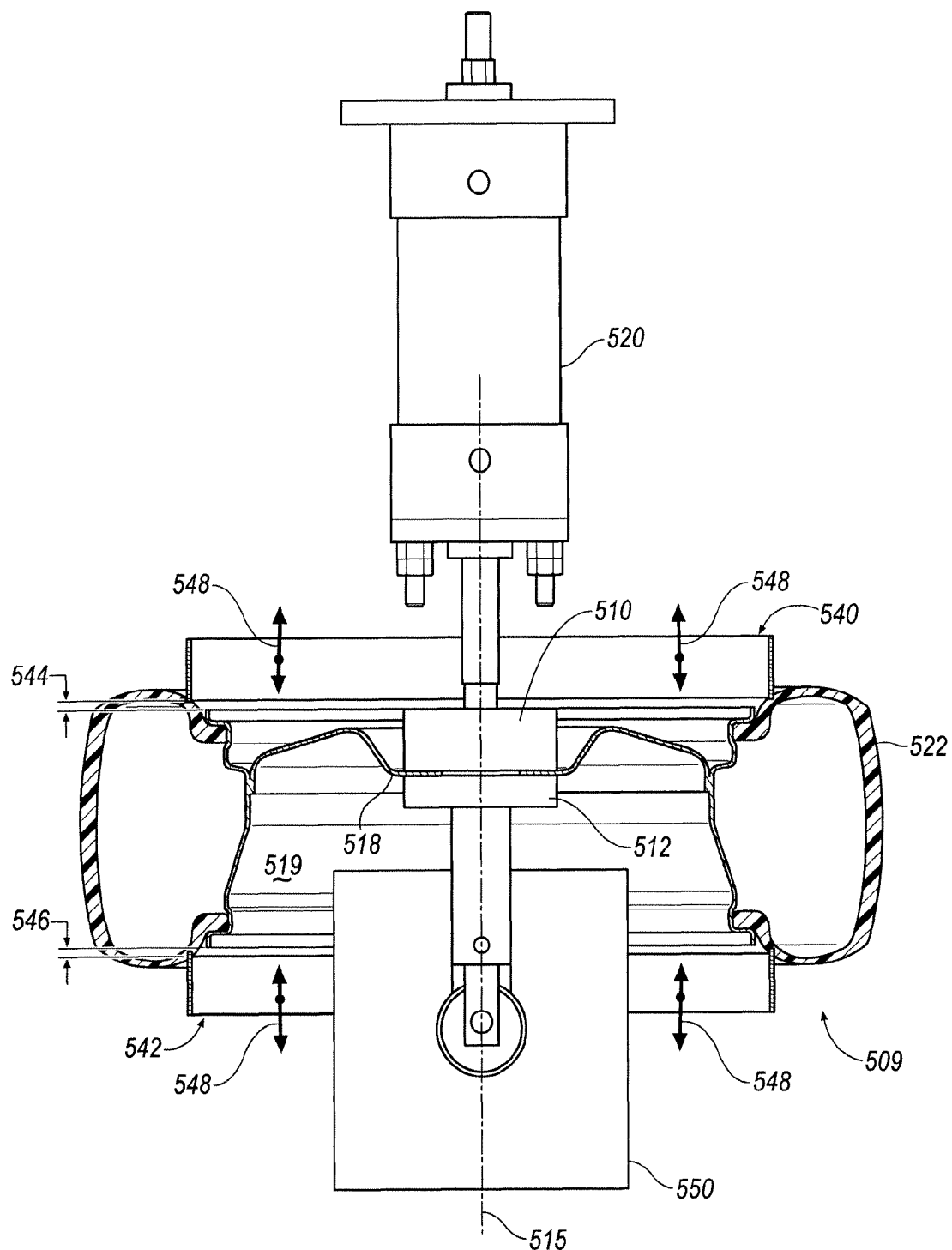
FIG. 24 is a partial cross sectional view of another embodiment of a tire bead seater.

Now referring to FIG. 24, the second embodiment of the present invention, includes upper wheel clamp 510, lower wheel clamp 512, and overhead cylinder 520 which function to clampingly retain the hub portion 518 of wheel 519 therebetween and with the addition of a lifting drive mechanism (not shown) are capable of lifting a wheeled cart 42, 66 off of the floor (wheeled cart not shown). The details of the interaction between upper wheel clamp 510, lower wheel clamp 512, overhead cylinder, and lifting mechanism are discussed above and will not be repeated here. Unlike the embodiment shown in FIG. 23, the embodiment shown in FIG. 24, does not use rotational movement about axis 515 in conjunction with deforming rollers 528, 530 to disturb the seating area between tire bead and wheel bead seat. Rather, the embodiment of FIG. 24 uses two platens (upper platen 540 and lower platen 542) to squeeze against the respectively associated upper and lower side wall portions of tire 522 while still remaining spaced apart 544, 546 from the lateral edge of wheel 519. Once this sandwiching relationship between the side wall portions of tire 519 and upper and lower platens 540, 542 has been established, one or both platens 540, 542 are vibrated 548 against their respectively associated tire side wall portions such that the vibrational energy imparted to the tire bead portion of tire 522 causes the tire bead to lodge properly in the wheel bead seat. At no time does the platen actually contact the lateral sides of wheel 519 and thus all the vibrational energy imparted to the wheel and tire assembly 509 is imparted from platens 540, 542 to the side walls of tire 522 in the proximate area in which the wheel bead seat interfaces to the tire bead. Vibrational energy 548 can be imparted to the platens using any number of well known techniques such as eccentric cams rotated by electrical, hydraulic, or pneumatic energy or the like. In an alternative embodiment, after platens 540, 542 are manipulated against the side walls of tire 522 to sandwich the tire side walls therebetween, the platens 540, 542 can remain stationary and the hub portion 518 of wheel 519 can be upwardly and downwardly vibrated. This upward and downward vibration of wheel 519 can be accomplished either by way of a dual purpose overhead cylinder which can be located above the tire and wheel assembly 509 (shown in FIG. 24) or below tire and wheel assembly 509 (not shown in FIG. 24) or can be imparted by way of a separate vibrational mechanism shown schematically as 550 in FIG. 24. It is not critical in the present invention whether wheel and tire assembly 509 is held fixed and platens 540, 542 are vibrated against tire 522 or whether platens 540, 542 are held in a sandwich relationship against the side walls of tire 522 and wheel 519 is vibrated. The only critical aspect of the present invention is that there be established a vibrational displacement of the tire bead seating portion of tire 522 in proximity of the bead seating portion of wheel 519.

While the disclosure has set forth various embodiments of the present invention, it is to be understood that the embodiments set forth herein are given by example and are not limiting. Those skilled in the art will readily recognize that there are numerous alternative designs and embodiments for practicing the invention that do not depart from the spirit of the present invention. Thus, it is to be understood that the present invention not only covers the specific embodiments disclosed herein but extends to all fair equivalents thereof.

What is claimed as new and desired to be protected by Letters Patent of the United States is:

1. A system, comprising:
   a mounting mechanism for joining a tire to a wheel to form a mounted tire-wheel assembly, wherein the mounting mechanism is a tire/wheel mounting work station including: a working head, a shaft extending from said working head, and a working arm assembly attached to said shaft, wherein said working arm assembly includes a working end and an extension cylinder, wherein said extension cylinder is selectively adjustable in a radial direction with respect to the shaft the working arm assembly; and
   a wheeled cart movably-positioned upon a prescribed path, wherein the wheeled cart supports the wheel and the tire, wherein the prescribed path traverses the tire/wheel mounting work station for permitting the wheeled cart to be positionally-interfaced with the tire/wheel mounting work station, wherein the wheeled cart includes: a base portion connected to wheels, a shaft portion extending from the base portion, a support member having a lower surface and an upper work surface, wherein the lower surface is connected to the shaft portion, and a post member connected to and extending away from the upper work surface, wherein said working arm assembly includes an interconnected triangular linkage assembly having a first bar, a second bar, and a third bar, wherein the first bar is non-movably-arranged in a fixed orientation relative to the second bar and the third bar, wherein the second bar includes a first end that is pivotably-connected to a first end of the first bar to permit the second bar to be movably-arranged in a non-fixed orientation relative to the first bar, wherein the third bar includes a first end that is pivotably-connected to a second end of the first bar to permit the third bar to be movably-arranged in a non-fixed orientation relative to the first bar, wherein a second end of the second bar is pivotably-connected to a second end of the third bar.

2. The system of claim 1, wherein said working head is horizontally manipulatable.

3. The system of claim 1, wherein said working head is vertically manipulatable.

4. The system of claim 1, wherein said shaft is rotatable.

5. The system of claim 1, wherein said working arm assembly rotates with said shaft upon rotation of the shaft.

6. The system of claim 5, wherein rotation of the shaft causes said working end to move along a circular path.

7. The system of claim 1, wherein said working end includes
   a wheel adapted to engage a tire bead region of a tire.

8. The system of claim 1, wherein, prior to positionally-interfacing the wheeled cart with the tire/wheel mounting work station, the tire of the tire-wheel assembly is disposed upon the wheel in an un-mounted orientation.

9. The system of claim 8, wherein, after the wheeled cart is positionally-interfaced with tire/wheel mounting work station, the tire/wheel mounting work station manipulates the un-mounted orientation of the tire to be arranged in a different orientation relative to the wheel, wherein the different orientation includes a mounted orientation such that the tire is mounted to the wheel.

10. The system of claim 1, wherein the shaft includes a post-receiving female portion defined by a lower portion of the shaft of the work station, wherein the post member of the wheel cart is matingly-coupled with the post-receiving female portion upon vertically manipulating the working arm assembly.

11. The system of claim 1, wherein the wheel of the tire-wheel assembly is disposed upon and supported by the upper work surface of the wheeled cart, wherein the post member extends through an opening of the wheel.

12. The system of claim 11, wherein the tire of the tire-wheel assembly is initially disposed upon the wheel in an un-mounted orientation, wherein, upon rotation of the working end, the working end contactively engages and circumscribes a sidewall surface of the tire in order to manipulate the un-mounted orientation of the tire to a different orientation relative to the wheel, wherein the different orientation includes a mounted orientation such that the tire is mounted to the wheel.

13. The system of claim 1, wherein the second bar is extendable or retractable upon pivoting the second bar relative to the first end of the first bar, wherein the second bar includes the extension cylinder.

14. A tire installing work station, comprising:
a working head,
a shaft extending from said working head, and
a working arm assembly attached to said shaft, wherein said working arm assembly includes a working end and an extension cylinder, wherein said extension cylinder is selectively adjustable in a radial direction with respect to the shaft, wherein said working arm assembly includes an interconnected triangular linkage assembly having a first bar, a second bar, and a third bar, wherein the first bar is non-movably-arranged in a fixed orientation relative to the second bar and the third bar, wherein the second bar includes a first end that is pivotably-connected to a first end of the first bar to permit the second bar to be movably-arranged in a non-fixed orientation relative to the first bar, wherein the third bar includes a first end that is pivotably-connected to a second end of the first bar to permit the third bar to be movably-arranged in a non-fixed orientation relative to the first bar, wherein a second end of the second bar is pivotably-connected to a second end of the third bar.

15. The system of claim 14, wherein the second bar is extendable or retractable upon pivoting the second bar relative to the first end of the first bar, wherein the second bar includes the extension cylinder.

* * * * *